Feb. 6, 1968 J. BARRINGTON ET AL 3,367,766
PREPARATION OF BRITTLE INORGANIC POLYCRYSTALLINE
POWDERS BY SHOCK-WAVE TECHNIQUES
Filed June 16, 1965 5 Sheets-Sheet 1
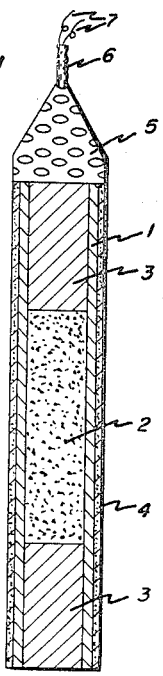
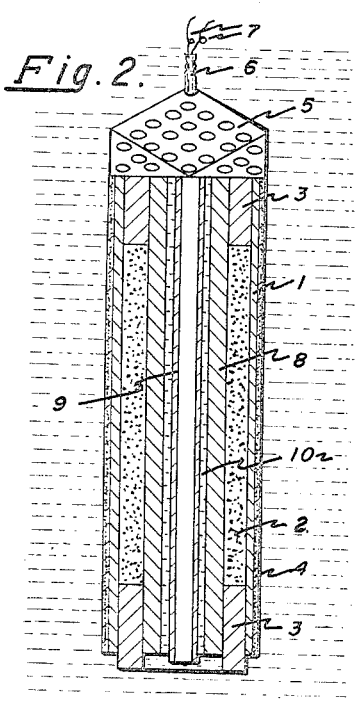
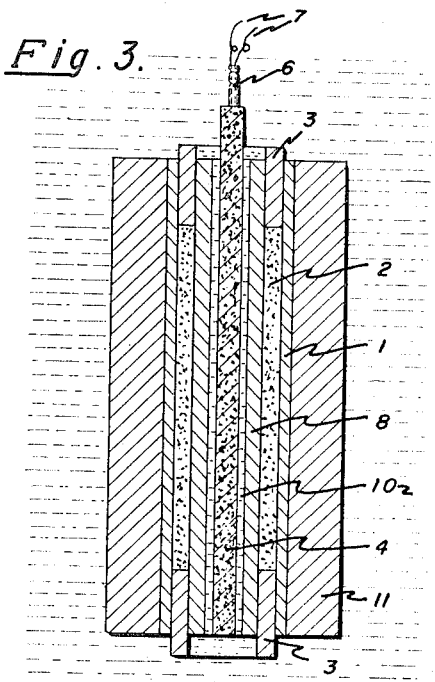
INVENTORS
J. BARRINGTON
O. R. BERGMANN
BY
Ernest H. Beck

Fig. 5.

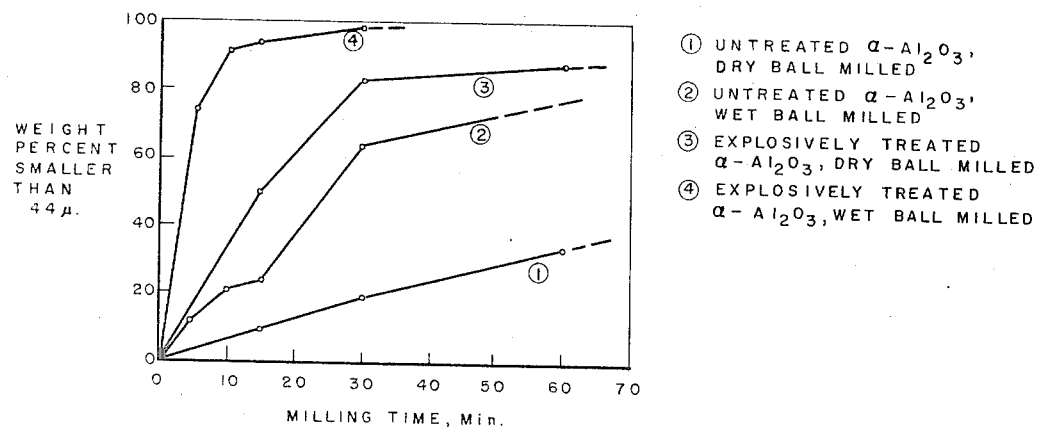

① UNTREATED $\alpha$-$Al_2O_3$, DRY BALL MILLED
② UNTREATED $\alpha$-$Al_2O_3$, WET BALL MILLED
③ EXPLOSIVELY TREATED $\alpha$-$Al_2O_3$, DRY BALL MILLED
④ EXPLOSIVELY TREATED $\alpha$-$Al_2O_3$, WET BALL MILLED

Fig. 6

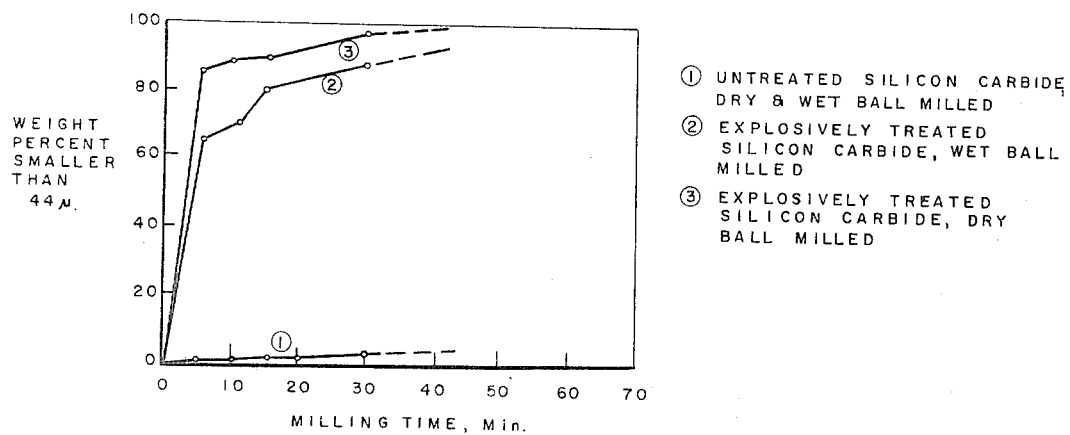

① UNTREATED SILICON CARBIDE, DRY & WET BALL MILLED
② EXPLOSIVELY TREATED SILICON CARBIDE, WET BALL MILLED
③ EXPLOSIVELY TREATED SILICON CARBIDE, DRY BALL MILLED

*INVENTOR.*
J. BARRINGTON
O. R. BERGMANN
BY Ernest H. Beck

① UNTREATED MgO, SINTERED at 1210°C.
② EXPLOSIVELY TREATED MgO, SINTERED at 1210°C.
③ UNTREATED MgO, SINTERED at 1390°C.
④ EXPLOSIVELY TREATED MgO, SINTERED at 1390°C.

① UNTREATED $Bi_2Te_3$
② EXPLOSIVELY TREATED $Bi_2Te_3$

United States Patent Office 3,367,766
Patented Feb. 6, 1968

3,367,766
PREPARATION OF BRITTLE INORGANIC POLY-CRYSTALLINE POWDERS BY SHOCK-WAVE TECHNIQUES
Jonathan Barrington, Hagerstown, Md., and Oswald R. Bergmann, Woodcrest, Cherry Hill Township, N.J., assignors to E. I. du Pont de Nemours and Company, Wilmington, Del., a corporation of Delaware
Continuation-in-part of application Ser. No. 264,135, Mar. 11, 1963. This application June 16, 1965, Ser. No. 477,997
20 Claims. (Cl. 75—.5)

ABSTRACT OF THE DISCLOSURE

Brittle inorganic crystalline powders having a strained crystal lattice, an average particle size of less than about 500 microns and small crystallite size; and their preparation by subjecting a mass of brittle inorganic crystalline powder, wherein the average particle size is no greater than about 4500 microns, to an explosively-generated shock wave, and thereafter comminuting the resulting agglomerate to break the weak mechanical bonds among its constituent particles. Because the powder products have the above combination of properties, they exhibit a high degree of activity in the sintering process.

---

Figure 4A:
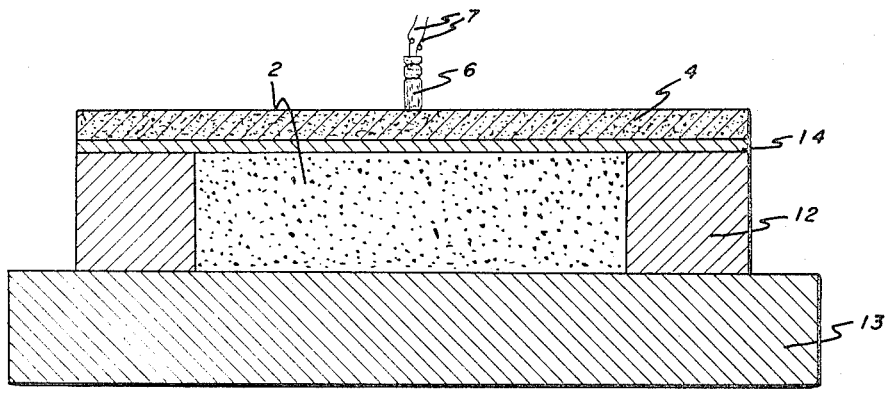

This application is a continuation-in-part of our copending application Ser. No. 264,135 filed Mar. 11, 1963, and now abandoned, which is in turn a continuation-in-part of our applications Ser. No. 156,009 filed Nov. 30, 1961 and Ser. No. 174,181 filed July 19, 1962, both now abandoned.

Fine powders, i.e., powders having small particle sizes, are used industrially in various forms. They particularly find wide use in the form of compacts of diverse shapes and sizes, i.e., cold-pressed, hot-pressed, or sintered compacts. In applications requiring reasonable strength in the compacts, the methods employed to fabricate them involve subjecting the powder to heat as well as pressure. The most commonly used compaction technique involves pressing the cold powder and then sintering the cold-pressed compact, i.e., heating it to a temperature below the melting point of the powder. Another technique, known as hot-pressing, which involves applying pressure to the hot powder, is not used extensively because of the equipment problems associated therewith. In a more recently developed method, dense compacts are made by applying explosive pressure to powders. The latter technique finds its widest utility in the preparation of objects of simple geometric form, e.g., rods, tubes, and slabs, from ductile powders.

In all of these compaction procedures, there are certain limitations placed on compact quality owing primarily to the nature of the powders being compacted. Greater strength and fracture-resistance of a compact is associated with a finer grain size of the material comprising the compact and with a higher-density compact. Thus, a fine-grained compact having a density approaching the crystalline density of the powder is expected to exhibit optimum physical and mechanical properties. In practice, however, with powders known to the art, the desired combination of optimum grain size and density is difficult to attain. Many powders have a low activity in the sintering process. With these, the sintering temperature and time required to insure minimum porosity often result in rapid and/or irregular grain growth, and a compromise between high density and small grain size must be made with a corresponding decrease in the optimum physical and mechanical properties to be expected in the powder compact. On the other hand, the high-activity powders heretofore known to the art are ultrafine, colloidal powders, i.e., those in the 5–250 millimicron size range, which as a rule have very low bulk density, exhibiting a "fluffiness" which makes handling and processing difficult and results in compacts of very low green (unsintered) density.

In short, there is a need in the art of powder technology for powders having properties which permit them to be cold-pressed and sintered to higher-quality compacts by the commonly used industrial processes than has heretofore been possible, and especially for powders of materials which until now have been difficult to sinter to high-quality compacts.

The present invention provides a new class of crystalline powders having a high degree of activity with respect to the sintering process as well as high bulk density and ability to be cold-pressed to high-density compacts. The present invention also provides a method of preparing such powders.

The powders of this invention are brittle inorganic crystalline powders having a strained crystal lattice as well as small crystallite and particle size, i.e., a particle size less than about 500μ. These powders, due in part to the strain therein, exhibit a high degree of activity for the sintering process. As a result, when compared to conventional powders, our powders produce stronger sintered compacts since they give higher-density compacts under comparable sintering conditions, while under milder sintering conditions (i.e., shorter times and/or lower temperatures) they produce compacts of comparable density without as much grain growth. Thus, the powders of this invention offer the advantage of high activity without the need to resort to ultrafine particle size, which in the case of the prior-art powders produces the undesirable "fluffy" condition described above. At the same time, however, the powders of this invention, in the ultrafine colloidal size range, do not possess the deleterious "fluffy" nature of the prior art colloidal powders, having, on the contrary, a satisfactory bulk density and capability of being cold-pressed to high-density compacts. The small particle and crystallite sizes of our powders also contribute to their high degree of activity for the sintering process and permit preparation of sintered compacts having smaller grain sizes, and thus greater strength, than compacts prepared from the same powders which have not been treated according to the process of this invention. In short, the brittle inorganic crystalline powders of this invention have a combination of strain, crystallite size, and particle size heretofore unknown in the powder technology art, a combination of properties whose significance not only manifests itself in the sintering process but also in other areas of utility as will hereinafter more fully appear.

The terms "crystallite" and "grain" are conventionally used herein to denote a crystallographically homogeneous portion of material comprising one continuous crystal lattice in which all unit cells have the same orientation, whereas "particle" is simply a piece of solid material that is discrete with respect to its extension in space. Thus a particle can, and in the context of this case normally does, consist of a number of crystallites.

The term "brittle powders" as used herein denotes powders of materials which normally fracture without appreciable plastic deformation when stressed mechanically. Thus this class of materials includes brittle nonmetallics, typically ceramics, e.g., brittle oxides, carbides, nitrides, borides, tellurides, and silicides, and compounds thereof such as titanates and ferrites, and intermetallics; as well as the ordinarily nonductile metals, e.g., tungsten, molybdenum, and beryllium. Our process is particularly beneficial for enhancing the amenability of brittle nonmetallics such as ceramics to sintering and thus their treatment and the resulting strained powders constitute preferred embodiments of this invention. The term "nonmetallic(s)" is used herein to denote materials other than metals in their elemental form.

The phrase "brittle powders having a strained crystal lattice" is one which, according to the present state of the powder technology art, is paradoxical in nature. Brittle materials are known to fracture without plastic deformation when stressed mechanically. For example, in such conventional processing procedures as ball-milling and die-pressing, brittle powders do not undergo plastic deformation and no noticeable lattice strain or cold-work is produced in them. In the powders of the present invention, however, strain and brittleness are not mutually exclusive properties.

The presence of lattice strain in the powders of this invention is confirmed by means of X-ray diffraction techniques and analysis of data thereby obtained. These powders all exhibit pronounced broadening of the X-ray diffraction lines. Line broadening can be determined from diffractometer plots according to procedures described in such standard texts as "X-ray Diffraction Procedures" by H. P. Klug and L. E. Alexander, John Wiley & Sons, New York, 1954; and "X-ray Diffraction by Polycrystalline Materials," H. S. Peiser, H. P. Rooksby, and A. J. Wilson, Editors, Chapman & Hall, Ltd., London, 1955. A measure of the line broadening, $\beta$, is the pure diffraction breadth of a diffractometer peak at half intensity found at a certain diffraction angle $2\theta$ and expressed in angular degrees after correction has been made for instrumental broadening.

The chief causes of X-ray diffraction line broadening are known to be small crystallite size, lattice strain (i.e., lattice distortion, plastic deformation, dislocations), or a combination of these two conditions. A careful analysis of the X-ray diffraction data permits a determination to be made concerning which of these factors is the major contributing cause of the broadening. Such an analysis is described by W. H. Hall in Proceedings of the Physical Society (London), vol. A62, p. 741 (1949), and by J. Mazur in Nature (London), vol. 164, p. 358 (1949). It is based on the fact that the relationship of the line broadening ($\beta$) to the diffraction angle ($\theta$) is different for the two effects. It has been established that line broadening caused purely by small crystallite size follows the relation:

(1) $$\beta(d) = \frac{K\lambda}{D \cos \theta}$$

where $\beta(d)$ = line broadening of the peak corresponding to lattice spacing $d$ (in angstroms) measured at half peak intensity and expressed in degrees $2\theta$;

$K$ = shape factor equal to 0.9;
$\lambda$ = wave length of X-radiation used (in angstroms);
$D$ = crystallite size (in angstroms);
$\theta$ = diffraction angle at which X-ray reflection occurs.

On the other hand, line broadening caused by lattice strain follows the relation:

(2) $$\beta(d) = \epsilon \tan \theta$$

where $\epsilon$ = strain, and the remaining terms are as defined for Equation 1.

Total line broadening caused by both effects therefore is:

(3) $$\beta(d) \cos \theta = \frac{K\lambda}{D} + \epsilon \sin \theta$$

A plot of Equation 3 is indicative of the source of line broadening. If there is no strain in the material ($\epsilon=0$), then a plot of $\beta(d) \cos \theta$ vs. $\sin \theta$ produces a straight line parallel to the abscissa and having an intercept of $K\lambda/D$. If strain is present, the line has a positive slope and passes through the origin if the crystallite size is large or intercepts the ordinate above the origin if there is also small crystallite size. The extent to which X-ray line broadening is caused by crystallite size reduction is shown by the difference between the intercepts $K\lambda/D$ for the lines for the treated and untreated powders with the ordinate. The crystallite size of the powder is obtained by solving Equation 3 for D when $\theta$ is zero.

Such an analysis performed on powders of this invention establishes that the X-ray diffraction line broadening characteristic of all of these powders is due to both small crystallite size and substantial lattice strain, the amount of strain relative to crystallite size reduction being inversely proportional to the hardness of the material treated. Furthermore, an X-ray line broadening analysis using Fourier analysis of the line profile according to the method of B. E. Warren and B. L. Averbach, J. Applied Physics 23, 497 (1952), carried out on some of these powders confirms the results obtained by the Hall and Mazur methods, i.e., that lattice strain is a major cause of the line broadening. This is graphically shown for our powders by a positive slope of the line $\beta(d) \cos \theta$ vs. $\sin \theta$ above 0.02, which represents a considerably greater degree of strain than can be induced in brittle inorganic crystalline powders by milling techniques heretofore known. For the brittle metal powders the slope will be above 0.05. Because they exhibit a higher degree of activity for the sintering process, nonmetallic and metal powders of this invention which are characterized by the line $\beta(d) \cos \theta$ vs. $\sin \theta$ having a positive slope of at least 0.05 and 0.1, respectively, are preferred.

The powders of the present invention are produced by a process which comprises (1) passing a shock wave generated by detonation of an explosive having a detonation velocity of at least 1500 meters per second through a mass of brittle inorganic crystalline powder having a bulk density of at least 10% of its crystalline density and an average particle size no greater than about 4500 microns, the shock wave being of sufficient intensity and velocity to convert said mass to an agglomerate and said powder being stable to deleterious physical and chemical change up to at least 300° C., and (2) comminuting the resulting agglomerate to break the weak mechanical bonds among its constituent particles.

In general, the above process will be effected by (a) placing an explosive having a detonation velocity of at least 1500 meters per second adjacent to a mass of a brittle inorganic crystalline powder having a bulk density of at least 10 percent of the crystalline density of the powder, said powder having an average particle size no greater than about 4500$\mu$ and being stable to deleterious physical and chemical changes up to at least 300° C., and the weight ratio of said explosive to said powder being between 0.01 and 10; (b) detonating said explosive so that a shock wave is propagated through said mass of brittle inorganic crystalline powder at a velocity of at least about 600 meters per second thereby imparting a particle velocity of at least about 300 meters per second to the particles of said mass of brittle inorganic crystalline powder; and (c) comminuting the resulting agglomerate of brittle inorganic crystalline powder.

As a practical matter, step (a) will normally entail placing the explosive contiguous to a metal container for the mass of powder, i.e., in contact with or closely adjacent to such container with any intervening space being occupied by a shock-transmitting medium such as water.

The term "agglomerate" is used herein to denote a friable, cracked mass of discrete particles and aggregates of particles bonded together by weak mechanical bonds as opposed to a homogeneous, coherent compact having significant inherent strength.

Because the novel powders of the invention are powders which have been exposed to an explosively induced shock wave, they are sometimes referred to herein as "explosively treated powders" and "shocked powders."

The process of the invention provides a method of introducing lattice strain into inorganic crystalline powders and for reducing their crystallite and particle size, and is particularly useful for introducing lattice strain into brittle materials which heretofore could not be significantly strained. The process can be applied to materials including those in which the constitutent atoms are predominantly held together by ionic bonds, those in which the constituent atoms are predominantly held together by covalent bonds, and metallic materials. Hereinafter we will refer to ionic and covalent crystalline materials simply as nonmetallic crystalline materials recognizing, however, that many materials are bound together by combinations of two or more different types of bonds and that some materials such as, for example, semiconductors, variously exhibit metallic and nonmetallic properties under different conditions. Furthermore, the process of the present invention can be applied to powders the particles of which are monocrystalline, i.e., composed of single crystals or crystallites, and to polycrystalline powders the particles of which are composed of a plurality of crystallites. Whether the powder particles initially are monocrystalline or polycrystalline, the process of the present invention produces a broadening of the X-ray diffraction lines of the powder due to an introduction of lattice strain therein, and also to a reduction in average crystallite size. In many cases, for example, when the powder to be treated comprises an inorganic nonmetallic crystalline material having an average particle size of more than about $1\mu$, the average particle size of the material is reduced.

As has been mentioned previously, explosive shock has been used heretofore to prepare strong dense compacts from ductile powders. The compaction process is not to be confused with the present process, however, which consists in an explosive treatment step applied to a brittle powder plus a step of comminuting the cracked agglomerate thereby obtained to recover the powder having a strained lattice and reduced crystallite sized, as evidenced by X-ray line broadening, as well as small particle size. Furthermore, the explosive-treatment step of the process of the present invention is per se significantly different from explosive compaction in several important respects. First, the prior art explosive compaction process involves careful control of explosive and material parameters to insure production of a crack-free compact, i.e., to insure bonding between the powder particles in the powder mass which is to be compacted. For example, the explosive surrounds the powder to be compacted and is initiated simultaneously at a number of points to insure generation of radially converging shock waves and uniform constriction and compaction of the powder mass. However, the object of the present invention is the preparation of brittle inorganic, crystalline powders in a loose form rather than as a coherent powder compact, and in fact, for any given powder, the present process uses an amount of explosive in excess of that which will effect formation of a crack-free compact. Additionally, radially converging shock waves are not required in the process of our invention. In essence, explosive treatment within the sense and scope of the present invention produces an agglomerate comprising lumps of aggregates or powder particles which particles are held together by weak mechanical bonds that are readily broken by mild deagglomeration.

It is believed that the lattice strain and crystallite size reduction established by X-ray diffraction line broadening, and the particle size reduction achieved by the present process result from collisions between the shock front, moving at a velocity of at least about 600 meters per second, and stationary particles, accelerating these particles to a velocity of at least about 300 meters per second. During these collisions part of the kinetic energy is dissipated by the production of new particle or crystalline surface area and by the introduction of strain and defects into the crystal lattice. The extent of particle size reduction is dependent upon the material subjected to explosive treatment. Metal powder particles which are less brittle than ceramics, for example, may be deformed but not shattered during explosive treatment. However, the average particle sizes of nonmetallic materials originally having an average particle size of more than about $1\mu$, including ionic and covalently bonded crystalline materials and a wide range of semiconductors, are substantially reduced by explosive treatment according to the present invention.

Figure 4B:
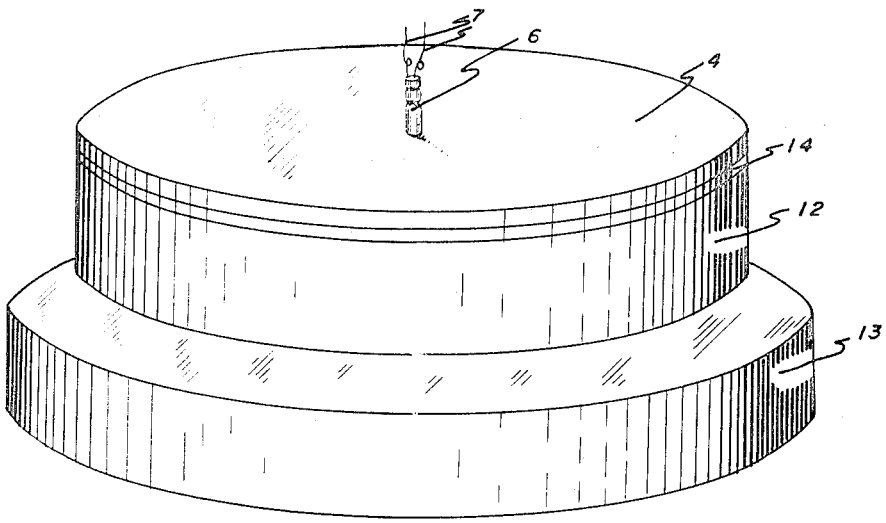
Figure 7:
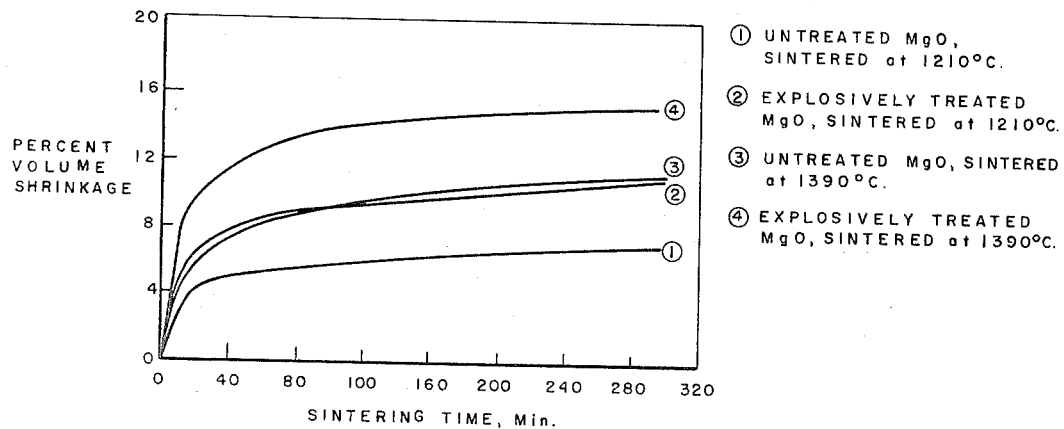
Figure 8:
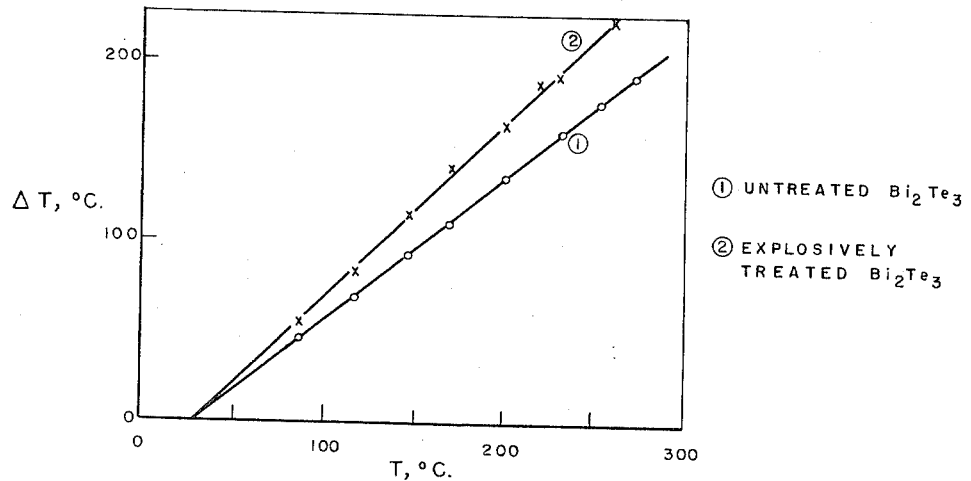
Figure 9:
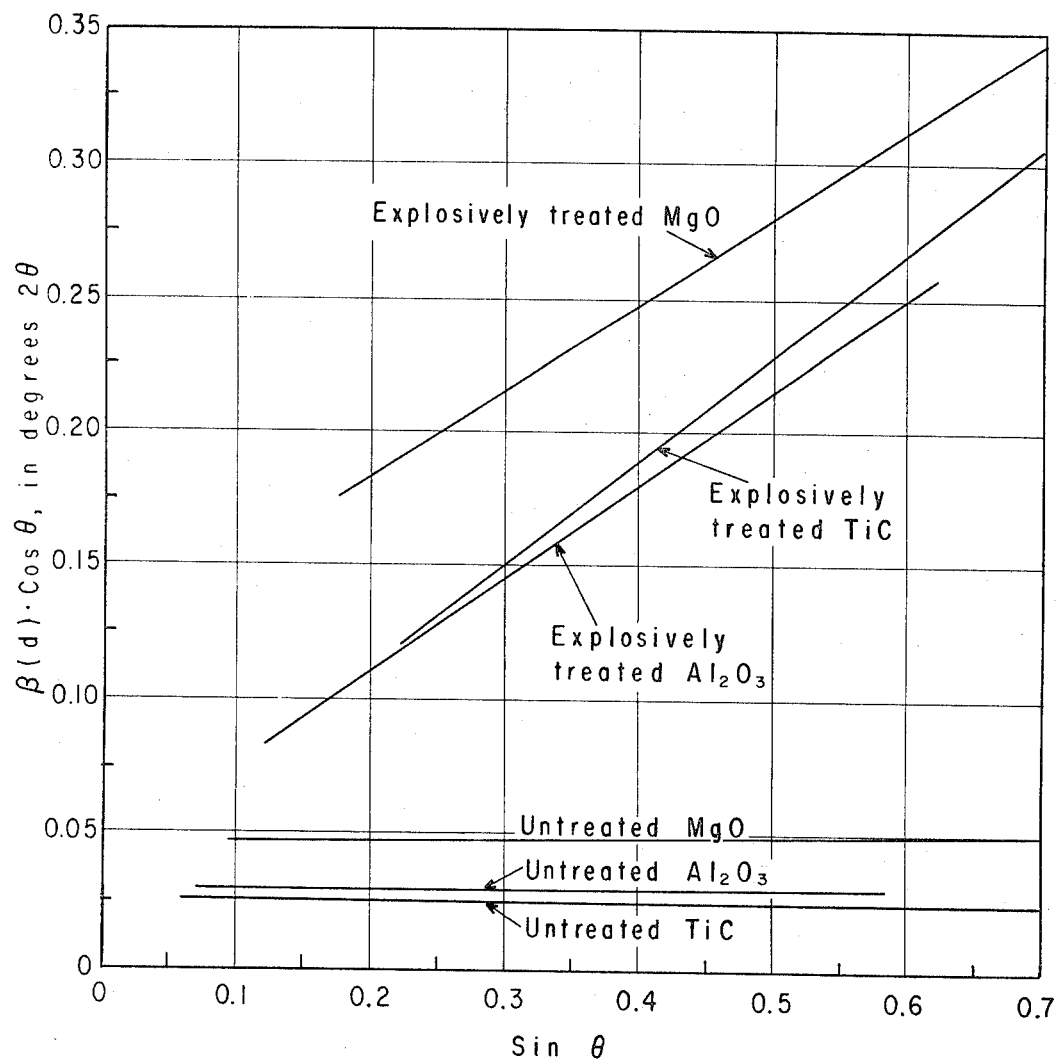

Reference is now made to the drawings in which like numbers indicate similar elements and in which FIGURES 1, 2, 3 and 4a illustrate cross-sectional views of assemblies used for explosively treating powder, FIGURE 4b represents a perspective view of the assembly illustrated in FIGURE 4a, FIGURES 5 and 6 are graphic illustrations of the effect of milling on the particle sizes of explosively treated and untreated alpha-alumina and silicon carbide, respectively, FIGURE 7 is a graphic illustration of the effect of sintering on the volume shrinkage of compacts of explosively treated and untreated magnesium oxide, FIGURE 8 is a graphic illustration of the temperature dependence of the thermal conductivity of explosively treated and untreated bismuth telluride, and FIGURE 9 is a graphic illustration of the above-described X-ray line broadening analysis performed on three of the powders of this invention and on three strain-free powders of the same composition.

In FIGURE 1, metal tube 1 is filled with powder 2 and the ends of the tube are sealed with metal plugs 3. The outside wall of metal tube 1 is sheathed by a layer of a detonating explosive 4 to which are attached a line wave generator 5 and an electric blasting cap 6 having lead wires 7 to a source of electric current.

In FIGURE 2, metal tube 8 is positioned concentrically within metal tube 1. The annulus between the adjacent walls of the two tubes is filled with powder 2 and the ends of the annulus are sealed with metal plugs 3. An air-filled metal tube 9, closed at both ends, is fastened by taping concentrically within metal tube 8 to absorb the energy of shock waves converging in the center of the assembly. The outside wall of metal tube 1 is surrounded with a layer of a detonating explosive 4 to which are attached a line-wave generator 5 and an electric blasting cap 6 having lead wires 7. The assembly is immersed in water 10 which flows into the annulus between metal tubes 8 and 9.

In FIGURE 3, metal tubes 1 and 8, powder 2, and metal plugs 3 are assembled as shown in FIGURE 2. A linear charge of a detonating explosive 4 to one end of which is attached an electric blasting cap 6 having lead wires 7 is positioned concentrically within metal tube 8. The entire assembly is positioned concentrically within a cylindrical cavity in a metal die 11 and the metal die 11 is immersed in water 10 which flows into the annulus between the linear charge of explosive 4 and the inside wall of metal tube 8.

In FIGURES 4a and 4b, metal ring 12 is secured to metal plate 13, e.g., by welding and the central cavity of metal ring 12 is filled with powder 2. Metal disk 14 is placed on top of metal ring 12 and covered with a disk of detonating explosive 4 to which is attached an electric blasting cap 6 having lead wires 7.

The use of a metal tube or ring assembly as shown in the drawings to contain the powder during explosive treatment is not critical to the practice of the present invention. The explosive can be placed in direct contact with the powder, for example, by inserting a cord of explosive into the mass of powder, laying a sheet of explosive on one surface of the mass of powder, or surrounding the mass of powder with explosive. However, care must be taken to avoid undesirable dispersion or contamination of the powder. The explosive also can be spaced some distance from a tube or ring assembly and/or from the powder and the space filled by some medium such as air, water or polystyrene, provided the shock velocity and particle velocity set forth above are attained.

However, the use of tube and ring assemblies substantially as illustrated in the drawings represents preferred embodiments of the process of the present invention, and it is to their use that the remainder of the discussion is directed.

The particle size of the starting inorganic crystalline powder shall be no greater than about 4500μ. The most satisfactory results are obtained when the average particle size is between about 1 and 150μ.

The powder which is to be subjected to the process of the present invention must be stable to deleterious physical and chemical changes at the temperature generated in the powder mass during explosive treatment. This temperature rises from ambient temperature prior to initiation of the explosive to a peak temperature generally to about 300° C. or higher during detonation. Thus any powder to be used as starting material for the present process should be stable to deleterious physical and chemical changes up to at least 300° C.

The meaning of the expression "deleterious (i.e., undesirable) physical and chemical changes" is clarified by considering the results desired from practicing the process of the present invention on any specific powder. Among the temperature-induced changes which can be encountered during explosive treatment are melting, followed by recrystallization in the form of relatively large crystallites, decomposition, phase transformation, and oxidation. Thus sodium ammonium phosphate

which decomposes at 79° C., and sodium arsenate

which melts at 86.3° C., are unsuitable as starting materials for the process of the present invention. Gamma-ferric oxide undergoes monotropic conversion to alpha-ferric oxide at 400° C. and care must be taken to adjust explosive and material parameters to keep the temperature within the mass below this level during explosive treatment if partial or complete conversion of the gamma phase to the alpha phase is to be avoided.

The compositions of tubes 1 and 8, plugs 3, die 11, ring 12, plate 13 and disk 14 are not critical since these components of the assemblies merely serve to contain the powder during detonation; however, these elements usually are made of metal and obviously must have sufficient strength to withstand the detonation pressure. The assembly used can be of any convenient dimensions and can be confined by any convenient medium such as air, earth, water, concrete, etc.

The powder can be hand-packed, press-packed, or vibrator-packed, in increments or in a single batch, or otherwise loaded into the desired tube or ring assembly to provide a mass of powder having a bulky density of at least 10 percent of the crystalline density of the powder. Although the use of 10 percent bulk density represents an operable embodiment of the present invention, a more efficient utilization of explosive energy is obtained when the bulk density of the mass of powder is at least 30 percent of the crystalline density of the powder. The nature of a particular material determines the bulk density to which a mass of that material, comprising powder having a given particle size, can be packed by following a given loading schedule. For example, powder of a plate-like, soft material such as bismuth telluride can be pressed easily to about 80 percent of its crystalline density while powder of a harder material such as barium titanate can be pressed to only 45 percent of its crystalline density under the same conditions. If desired, the tube or ring assembly can be evacuated prior to loading.

Neither the composition, the physical form, nor the means of detonating the explosive is critical. Self-supporting sheets or cords of compositions based on crystalline explosives such as pentaerythritol tetranitrate or physical mixtures or granular amatol explosives comprising ammonium nitrate and trinitrotoluene initiated by blasting caps, line-wave generators, or detonating fuses represent convenient combinations for use in the practice of the present invention.

The detonation velocity of the explosive should be at least 1500 meters per second. The strong rarefaction waves usually associated with the detonation of an explosive having a detonation velocity considerably greater than 1500 meters per second, for example, between 3000 and 8000 meters per second, make such an explosive particularly effective in reducing the particle size of the powder mass. Commercial explosives having detonation velocities greater than about 8000 meters per second are not commonly available, and this velocity therefore represents a practical upper limit.

The weight ratio of explosive to powder and the disposition of the explosive relative to the powder are adjusted to insure that the shock wave propagated through the mass of powder is of sufficient velocity and intensity to produce and agglomerate. The amount of explosive should be insufficient to cause the temperature level in the powder mass during detonation to reach the level at which deleterious physical or chemical changes take place. In general, these requirements are satisfied by using a weight ratio of explosive to powder between 0.01 and 10, harder materials requiring higher ratios to produce a given degree of strain. Although ratios in excess of 10 are operative, they do not appear to offer any additional advantage in terms of the properties of the resulting powder, and do, of course, place greater demands on the size and strength of the equipment required. Generally the most significant results are achieved using a weight ratio of explosive to powder in the range of about from 0.5 to 5, and therefore this range is preferred. The ratio of explosive to powder is determined on the basis of the amount of explosive which directly shocks the powder mass, e.g., the amount of explosive 4 which is vertically co-extensive with powder 2 in FIGURES 1 to 3 and the cylinder of explosive 4 which is circumferentially coextensive with cylinder 2 of powder in FIGURE 4a. The excess explosive shown in FIGURES 1 to 4 is used to reduce the possibility of shearing tube 1 (FIGURES 1 and 2), tube 8 (FIGURE 3) and plate 14 (FIGURE 4) along the edges of the powder-containing cavity. When the powder is subjected to more than one shock treatment, the sum of the amounts of explosive employed should be such as to give an explosive/powder ratio within the above ranges.

Generally, for a given material under a given set of conditions, the extent of particle size reduction and of lattice strain and crystallite size reduction as evidenced by X-ray diffraction line broadening increases with an increasing weight ratio of explosive to powder. Repeated explosive treatment either with or without intermediate deagglomeration often results in increased strain and smaller crystallite and particle sizes than can be achieved by a single treatment. However, the optimum weight ratio and number of explosive treatments for maximum strain and particle and crystallite size reduction depends upon the nature of the powder to be treated, upon the bulk density of the mass of powder, upon the dimensions and geometry of the assembly, and upon the nature of the explosive. For example, in an assembly of the configuration illustrated in FIGURE 3, the shock and compressive forces generated by detonation of the explosive are utilized efficiently and a smaller weight ratio of explosive to powder is required than is required to achieve an equivalent degree of strain and size reduction in an assembly of one of the types illustrated in FIGURES 1, 2, or 4a or b. Also, when the detonation is conducted in a dense medium such as water, a lower ratio of explosive to powder can be used than when the detonation is effected in a less dense medium such as air.

The method used for comminuting the agglomerate produced by explosive treatment is not critical and has substantially no effect upon the lattice strain and crystallite size of the explosively treated powder. As was mentioned above, the explosive treatment effects reduction of the average particle size of the brittle nonmetallic powders having an average particle size greater than about $1\mu$, as well as introducing strain into the powders and reducing their average crystallite size. Comminution of this material involves breaking only the simple, mechanical bonds between the particles of reduced size, which bonds give some degree of coherence to the lumps of material which comprise the agglomerate. In many cases hand-crushing with or without a mortar and pestle is sufficient. However, any conventional method of comminution such as grinding, wet or dry ball-milling, fluid-energy milling, vibratory milling, or attrition-milling is suitable.

The powders of this invention have small particle sizes, i.e., an average particle size of up to about $500\mu$. While larger-size powders might be useful in some particular applications, generally as the average particle size becomes increasingly larger beyond $500\mu$ the advantage of high activity gained by the presence of lattice strain in the powders becomes less. As a rule, the process of the invention results in powders having an average particle size less than about $150\mu$ in the case of nonmetallic powders, and less than about 200 microns in the case of metal powders, without comminution beyond that required to deagglomerate the product resulting from the explosive treatment step. Powders of this invention in such size ranges are readily processed to dense, strong compacts and therefore are preferred. Powders having an average particle size in the colloidal size range, generally understood to embrace a size range of about from $0.005\mu$ to $0.25\mu$, can be prepared by the process of this invention when a colloidal powder is used as the starting material. Such powders do not exhibit the "fluffiness" of the prior art colloidal powders and can be cold-pressed to high-density compacts. However, the powders in larger-than-colloidal sizes are preferred since they exhibit such high activity that the added expense of starting with the more expensive colloidal-size powders is not warranted. Powders prepared from nonmetallic starting materials having a particle size in the preferred range have an average particle size down to about 0.5 micron after deagglomeration.

The average particle size of the shocked powders, milled for a given length of time, generally is smaller than that of a sample of the unshocked powder milled for the same length of time. This will always be the case with nonmetallic powders. Often, the average particle size of the explosively treated powder is smaller than that of the untreated powder regardless of the length of the milling period. The short milling time required for comminution of the explosively treated material enables production of high-purity powders uncontaminated by the milling medium and prevents extensive wear of the milling equipment. In most cases the explosively treated powders have higher bulk density than untreated powders of comparable particle size. This latter property greatly facilitates subsequent handling and processing of the explosively treated powders.

The small particle sizes and high apparent densities of the explosively treated powders make them suitable for use as loose powders in a variety of polishing, abrasive and other applications.

Silicon carbide, for example, cannot be prepared as a powder having particle size smaller than $12\mu$ by a conventional grinding operation, and the finest powders cannot be supplied with as high a purity as the coarser grades because of contamination from the grinding means, generally iron, iron oxide, silicon dioxide, or alumina, introduced during the long (12 to 100 hours) grinding process. However, the process of the present invention enables production of high-purity silicon carbide powder having an average particle size as small as 0.5 to $2\mu$ from powder having an initial particle size as great as $4500\mu$. Obviously, coarse silicon carbide can be reduced in particle size to a considerable extent by ball milling. But the uniquely fine powder particles produced by the process of the present invention have the added advantage of having rough, angular edges appropriate for abrasive applications as opposed to the more or less smooth, rounded edges often characteristic of ball-milled material. Loose explosively treated silicon carbide powder has superior polishing properties, and is useful as a pigment providing good coverage and having a higher index of refraction than titanium dioxide or diamond. The unique fineness and angularity of the powder also enables fabrication of silicon carbide compacts by slip casting and the powder offers superior wear resistance in bonded abrasives such as finishing wheels and stones, nylon buffers used to deburr fine metal parts, and cork finishing belts.

The finest boron carbide powder prepared by conventional grinding means has an average particle size of 6 to $12\mu$. Boron carbide powder having a particle size in this range is difficult to prepare by grinding, both because it is second in hardness only to diamond, and because it tends to decompose and/or react with or be contaminated by the grinding medium. However, our explosively treated boron carbide having a particle size of 0.5 to $2\mu$, while being considerably less expensive than diamond, is satisfactory for those applications mentioned above in connection with silicon carbide as well as for a number of lapping and polishing operations requiring extremely fine finish. It can be employed in the form of loose powder or suspended in a carrier medium.

The explosively treated brittle inorganic crystalline powders of this invention generally can be cold-pressed with or without lubricants such as water or paraffin to form compacts of any desired shape having higher density, transverse rupture strength, and hardness than compacts of untreated powders cold-pressed under the same conditions. Conversely, a compact having a given density can be prepared by compacting an explosively treated powder at a lower pressure than is required to prepare a compact of the same density from a sample of the untreated powder. The cold-pressed density of powder compacts made from some explosively treated powders is higher than that of the compacts made from the same but untreated powders regardless of the compacting pressure. The use of relatively low pressures is particularly desirable if the powder to be compacted is a hard ceramic composition which causes extensive wear of expensive dies when compacted at high pressures. The surprisingly high cold-pressed density of compacts made from explosively treated powders probably is due to the high density of the individual particles and to the high bulk density of the loose explosively treated powders.

High-strength cold-pressed compacts of bismuth telluride are desirable for use in thermoelectric devices. Improvement of a material for use in thermoelectric equipment can be effected by reducing either the electrical resistance or the thermal conductivity of the material. Extensive solid state research has been directed to the effort to increase the electrical conductivity of bismuth telluride. We have found that the bismuth telluride powder prepared by the process of the present invention, which will generally have an average particle size between about 0.5 and 150 microns and an X-ray diffraction line broadening $\beta(d\ 2.03\ \text{A.})$ ranging about from 0.07 to 0.40 degree $2\theta$, has reduced thermal conductivity, and thus enhanced suitability for use in, for example, thermoelectric semiconductive devices.

The powders of the present invention find their properties put to best use for forming strong sintered and hot-pressed compacts. This is particularly true for refractory oxides and carbides which are difficult to sinter by conventional methods. Several factors allow preparation of sintered compacts from cold-pressed compacts of the explosively treated brittle powders, which sintered compacts have higher strength and hardness than sintered compacts prepared from untreated powders. First, sintered compacts prepared from the explosively treated powders generally have smaller grain sizes than those of sintered compacts prepared under the same conditions from untreated powders. This probably can be attributed to the higher activity of the explosively treated powders due to lattice strain as well as small particle and crystallite size, and consequently to the relatively rapid sintering rates of the explosively treated powders which permit sintering of such powders at lower temperatures and for shorter lengths of time than can be employed with untreated powders.

Second, sintered compacts prepared from explosively treated powders generally have higher density than that of sintered compacts prepared under the same conditions from untreated powders, and, in many cases, have higher density than compacts prepared from untreated powders regardless of the sintering conditions. This high sintered density often can be attributed to the relatively high cold-pressed density of explosively treated powders which leads to reduced shrinkage and warpage during sintering. However, the sintered density of compacts prepared from explosively treated powders often is higher than that of compacts prepared from untreated powders even when the cold-pressed density of the explosively treated powders is comparable to or lower than that of the untreated powders.

The rapid sintering rate of the powders of this invention derives in part from the relatively low activation energy associated with sintering such powders. It is well known in the art that the activation energy associated with sintering increases as sintering proceeds. However, the initial activation energy associated with sintering the powders of this invention is lower than that associated with sintering conventional powders and it remains at the initial low level for longer lengths of time than it does with conventional powders. Further, since surface tension is a driving force in sintering, the rapid sintering rates of our powders probably derive in part from the higher specific surface areas characteristic of these powders.

The nature of the brittle inorganic crystalline powders of the invention and the properties desired in the sintered compact determine the optimum sintering conditions. The proper furnace, atmosphere, and rates of heating and cooling to be used in sintering a particular powder are generally the same as those used in sintering powders heretofore known to the art. Sintering time and temperature may differ, however. In general, to achieve a given density, a sintering temperature lower than that used with conventional powders can be employed. Also, the sintering time often can be shortened. In cases in which higher density is desired than can be achieved with conventional powders, there may not be as great a sintering temperature and/or time differential between the explosively treated and the untreated powders, but the higher density will be achieved with our powders without sacrifice in strength owing to grain growth. Generally powders having particle sizes between 0.5 and 500µ and cold-pressed densities between 40 and 80 percent of their crystalline densities give the best sintered compacts. Comparable high-quality sintered compacts also can be prepared by simultaneously pressing and sintering explosively treated powders.

Alpha-alumina which has been treated by the process of this invention will have an average particle size between about 0.5 and 150 microns and an X-ray diffraction line broadening $\beta(d\ 2.09\ A.)$ of at least about 0.05 degree $2\theta$ and generally not in excess of about 0.50 degree $2\theta$. Sintered compacts of such alpha-alumina have considerable mechanical strength, particularly at elevated temperatures, high dielectric constants, and excellent chemical, abrasion, and thermal shock resistance. These compacts can be employed as electronic tube parts, high-frequency insulators, holders and spacers for printed circuits, and ceramic to metal seals. They are suitable structural materials for radomes, missile nose cones, nozzles, plungers and liners in reciprocating pumps, cutting tools, grinding wheels, thread guides for use in spinning synthetic fibers, and non-lubricated, refractory roller bearings. Very finely divided, high-purity alpha-alumina such as is produced by the proccess of the present invention also is useful in optical instruments and in catalyst systems.

Sintered compacts of explosively treated silicon carbide and molybdenum disilicide which exhibit high strength at elevated temperatures are appropriately employed in electrical heating elements, and the silicon carbide powder can be incorporated into alumina cutting tools. Wear-resistant sintered compacts of the novel boron carbide can be used to cover the faces of high-quality micrometers.

Refractory sintered compacts of explosively treated magnesium oxide and zirconium oxide are satisfactory materials for furnace linings and zirconium oxide is utilized in radiation shields, crucibles for service above 2000° C., and in a number of semiconductive devices such as electrical resistors in high-power projection lamps.

Sintered compacts of titanium carbide prepared from explosively treated powder have adequate strength for utilization in crucibles used for melting metals and in turbine blades for jet engines. Mixtures of titanium carbide and tungsten carbide with metals and/or with other ceramics are employed extensively in a variety of cutting tools.

Compacts fabricated from explosively treated molybdenum powder by pressing, sintering, and swaging can be used in electronic grids, and alloys of molybdenum and tungsten in conjunction with compacts made from explosively treated pure tungsten powder are suitable as thermocouples for use up to 3000° C. Tungsten wire drawn from bars prepared from explosively treated tungsten powder has the high fusion temperature and electrical resistivity which make it ideal for incandescent filaments in lamps and resistances in electric furnaces. Since the superior physical properties of sintered compacts prepared from explosively treated and comminuted metal powders are directly related to the lattice strain and reduced average crystallite sizes of these materials, the process of the present invention can be used to advantage for treating any brittle metal powder prior to fabrication of a sintered or hot-pressed compact therefrom.

The superiority of sintered compacts prepared from explosively treated powders for most of the above-mentioned applications derives from the superior strength of these compacts under a broad range of conditions. However, sintered compacts of explosively treated powders such as barium titanate and barium ferrite are particularly desirable for special applications in which mechanical strength, while of considerable importance, is not the primary interest.

Barium titanate is a ferroelectric ceramic which is used widely in capacitors in the power and communication industries and in a variety of piezoelectric devices. Barium titanate prepared by the process of this invention and having an average particle size between about 0.5 and 150 microns and an X-ray diffraction line broadening $\beta(d\ 2.32\ A.)$ ranging about from 0.05 to 0.35 degree $2\theta$ gives sintered compacts of unusually high density. This high density is responsible for correspondingly high values for the dielectric constant of the material, and the relatively small grain size characteristic of these compacts modifies the effect of temperature on the dielectric constant, particularly in the region of the Curie temperature of the material. Both of these features greatly enhance the utility of barium titanate over a wide range of temperatures and operating conditions.

Barium ferrite is a ferromagnetic oxide. Permanent magnets made from this material generally have low density and low eddy current loss and high chemical and electrical resistance and are employed in loud-speaker circuits, holding assemblies, oil filters, electric generators and motors, magneto-mechanic couplings, and equipment used to focus electron beams. The quantities generally used to evaluate a magnetically hard material include the remanent magnetization, $B_R$, which is equal to the magnetization which remains when a ferromagnetic material is exposed to an effective field at least as great as its saturation magnetization and subsequently the effective field is brought continuously to zero; the intrinsic coercive force, $_IH_C$, which is equal to the effective field in the direction opposite to the remanent magnetization which must be applied to reduce the total magnetization to zero; the coercive force, $_BH_C$, which is equal to the effective field in the direction opposite to the remanent magnetization which must be applied to reduce the magnetic induction to zero; and $(BH)_{max}$, which is equal to the maximum value which the product of the magnetic induction, B, and the effective field, H, can attain on the demagnetization curve.

Barium ferrite generally is prepared by firing a mixture of barium oxide and ferric oxide or of some other appropriate compounds such as carbonates of these metals, at a temperature of at least 1000° C. The broadening, $\beta$, of the X-ray diffraction lines of this product is less than $\beta(d\ 2.77\ A.) = 0.03$ degree $2\theta$. None of the prior art comminution processes can be used to prepare barium ferrite having a line broadening greater than $\beta(d\ 2.77\ A.) = 0.05$ degree $2\theta$.

Barium ferrite permanent magnets generally are prepared (1) by incorporating barium ferrite powder into a suitable binder, a suitable binder being, for example, an epoxy resin, polytetrafluoroethylene, polyvinyl chloride, a polyurethane, a styrene-butadiene rubber, polychloroprene, etc., or (2) by cold pressing the powder to at least 50 percent, and preferably 70 percent, of its crystalline density and sintering the cold-pressed compact at at least 1000° C., and preferably between 1200 and 1280° C., during which sintering process the average X-ray line broadening of the material invariably diminishes to less than $\beta(d\ 2.77\ A.) = 0.04$ degree $2\theta$. In either case, the material is magnetized by exposure to a saturating magnetic field of at least 6000 oersteds, and preferably 10,000 to 14,000 oersteds. The magnetic strength of unsintered and sintered barium ferrite can be increased by magnetic orientation of the material and/or by annealing the material.

Barium ferrite produced by the process of the present invention always has an X-ray line broadening $\beta(d\ 2.77\ A.)$ of at least 0.05, generally not in excess of about 0.49 degree $2\theta$. Such powders usually have an average particle size between about 0.5 and 150 microns. By carefully controlling the conditions under which sintering is carried out, sintered compacts comprising barium ferrite having a line broadening $\beta(d\ 2.77\ A.)$ of at least 0.04 degree $2\theta$ can be prepared from the explosively treated powder. These sintered compacts and permanent magnets prepared therefrom represent novel articles of manufacture.

Permanent magnets prepared from explosively treated barium ferrite generally have higher coercive forces than do permanent magnets prepared under the same conditions from untreated barium ferrite. The high density characteristic of compacts prepared from explosively treated powders leads to production of barium ferrite magnets having high remanent magnetization.

The following examples illustrate some of the modifications of the process of the present invention to prepare the novel powders. They are intended as illustrative only, however, and are not to be considered as exhaustive or limiting.

In each of these examples the powder was subjected to explosive treatment in one of the assemblies illustrated in the attached drawings.

Three assemblies of the type illustrated in FIGURE 1 were used. In the first of these, the metal tube was a seamless stainless steel tube 7 inches long having an inside diameter of ⅞ inch and a wall thickness of ⅛ inch. The metal plugs were made of cold-rolled steel and were ⅞ inch in diameter and 1¾ inches long. In the second assembly the metal tube was a seamless cold-rolled steel tube 9 inches long having an inside diameter of 1¾ inches and a wall thickness of ⅛ inch. Metal plugs 3 were made of cold-rolled steel and were 1¾ inches in diameter and 1 inch long. In the third assembly the metal tube was a seamless aluminum tube 7 inches long having an inside diameter of 1¾ inches and a wall thickness of ⅛ inch. Metal plugs 3 were made of aluminum and were 1¾ inches in diameter and 1¼ inches long.

A plug was inserted into one end of the tube and welded in place. The tube was loaded by press-packing powder into the bore using an average hydraulic pressure of 8 to 10 tones. The open end of the tube was sealed by inserting the second plug and welding it in place.

Except where otherwise noted the explosive used in the following examples was a flexible explosive composition consisting of 20 parts by weight of pentaerythritol tetranitrate, 70 parts red lead, 2 parts polybutene and 8 parts of a 50/50 mixture of butyl rubber and a thermoplastic terpene resin, e.g., a mixture of polymers of $\beta$-pinene of formula $(C_{10}H_6)_n$. This explosive detonates at a velocity of about 4100 meters per second.

An extruded sheet of the explosive was glued around the outside wall of the tube and a line-wave generator and blasting cap were attached as shown in FIGURE 1. The blasting cap was actuated by application of electric current and initiated, in turn, the line-wave generator and the layer of explosive. Detonations were carried out in air and under water.

The weight ratio of explosive to powder was calculated as described above and was sufficient in all examples to subject the entire mass of powder to a shock wave having a velocity in excess of 600 meters per second and to impart a particle velocity in excess of 300 meters per second to the particles of such mass.

One assembly of the type illustrated in FIGURE 2 was used. The larger metal tube was a seamless aluminum tube 7 inches long having an inside diameter of 1¾ inches and a wall thickness of ⅛ inch. The smaller metal tube was a seamless aluminum tube 7 inches long having an inside diameter of ½ inch and a wall thickness of ¼ inch. The metal plugs were aluminum rings 1¼ inches long having an inside diameter of 1 inch and a wall thickness of about ⅜ inch. The smaller tube was positioned concentrically within the larger tube and maintained in place by means of a plug which was inserted into one end of the annulus between the two tubes and welded in place. The annulus between the adjacent walls of the two tubes was lined with paper and vibrator-packed with powder to within about 1¼ inches of the open end. The second plug was inserted into the open end of the annulus and welded in place. An air-filled copper tube 7¾ inches long and sealed at both ends, having an outside diameter of ¼ inch and a wall thickness of ⅟₃₂ inch was positioned concentrically within the inner aluminum tube so that a portion of the copper tube about ⅜ inch long extended beyond each end of the tube assembly and taped in place. An extruded sheet of the above-described explosive composition was glued around the outside wall of the outer aluminum tube and initiated as described above. All detonations were carried out under water.

One assembly of the type depicted in FIGURE 3 was used. Aluminum tubes and plugs of the same composition and dimensions were assembled and loaded as described above for FIGURE 2. The copper tube was omitted and an extruded cord of the above-described explosive composition to one end of which was attached a blasing cap was taped in place concentrically within the inner aluminum tube. The tube assembly was inserted in the bore of a cylindrical steel die 7 inches long having an inside diameter of 2 inches and a wall thickness of 1 inch. The blasing cap was actuated by application of electric current. All detonations were carried out under water.

One assembly of the type shown in FIGURES 4a and b was used. A steel ring 1 inch high having an inside diameter of 3 inches and a wall thickness of 1 inch was positioned concentrically on a disk-shaped section of steel plate 1 inch thick and 8 inches in diameter and welded in place. The 3-inch-diameter cavity in the ring was vibrator-filled with powder. The cavity was closed with a steel disk 1/16 inch thick and 5 inches in diameter which was taped in place on top of the steel ring as shown in FIGURE 3. The steel disk was covered with a disk of the above-described explosive composition to the center of which was attached a blasting cap. The blasting cap was actuated by application of electric current and initiated the disk of explosive. All detonations were carried out in air.

In most cases the explosively-treated powder was recovered by making longitudinal slits in metal tube 1 and stripping the tube from the powder. Naturally the tube assembly was removed from the steel die prior to recovery of the powder when the assembly illustrated in FIGURE 3 was used, and the powder treated in the assembly depicted in FIGURES 4a and 4b was recovered simply by removing the steel disk. Unless otherwise indicated, the agglomerated powder was comminuted by ball-milling dry, using an alumina mill and balls.

The X-ray diffraction line broadening of the powder, both before and after explosive treatment, was determined by the procedure described by H. P. Klug and L. E. Alexander, cited above, pages 491–538. Copper radiation of 1.54 angstrom wavelength was used for the X-ray diffraction work on all powders except for barium ferrite and $\gamma$-$Fe_2O_3$ for which cobalt radiation of 1.79 angstrom wavelength was used. Before initial explosive treatment, all powders were essentially strain-free. The X-ray diffraction line broadening, $\beta$, values hereinafter given for the explosively shocked powders are due to both crystallite size reduction and substantial lattice strain. A plot of $\beta(d) \cos \theta$ vs. $\sin \theta$ for the shocked nonmetallic powders illustrated in the following examples gives a straight line intercepting the ordinate above the origin and having a positive slope above 0.02, while such a plot for the metals of Examples 35–37 gives a straight line intercepting the ordinate above the origin and having a positive slope above 0.05.

The average particle size was determined, in most cases, by screening and by examination of a number of photomicrographs obtained by light and electron microscopy. When it is stated hereinafter that a certain powder was milled "to a particle size smaller than" a certain number of microns, it is meant that the powder was milled until 100% of it would pass through a screen having openings of the designated micron size.

EXAMPLE 1

A 74.2 gram sample of $\alpha$-alumina having a diffraction line broadening $\beta(d\ 2.09\ \text{A.})$ of less than 0.03 degrees $2\theta$ and an average particle size of about 44$\mu$ was subjected to explosive treatment as shown in FIGURE 1 in the stainless steel tube described above. The bulk density of the powder as packed in the tube prior to detonation was 1.96 grams per cubic centimeter or 49.4 percent of the crystalline density of the material. The weight distribution of the explosive was 30 grams per square inch, giving a weight ratio of explosive to powder of 5.0.

Explosive treatment produced a cracked agglomerate of $\alpha$-alumina which was crushed by hand. A sample of the explosively treated powder which was rubbed off a lump of the agglomerate had an average particle size of about 1$\mu$.

FIGURE 5, in which the weight percent of a given sample of $\alpha$-alumina having an average particle size smaller than 44$\mu$ is plotted against time, compares the rate and extent of particle size reduction of explosively treated and untreated $\alpha$-alumina subjected to wet (water medium) and dry ball-milling operations. The input to the ball mill for curves 1 and 2 was untreated powder having an average particle size of about 44$\mu$. These curves exhibit a relatively slow and steady decrease in particle size with milling time as would be expected in a conventional grinding process in which interatomic bonds are broken. The input to the ball mill for curves 3 and 4 was the hand-crushed agglomerate described above. These curves exhibit extensive reduction of the particle size of the bulk of the material in a relatively short time. This behavior is consistent with the explanation that the "milling" operation was simply comminution of a weak, friable agglomeration of very fine $\alpha$-alumina particles held together by weak mechanical bonds prior to milling.

Curves 2 and 4 are more indicative of the effect of milling than are curves 1 and 3 since dry-milled $\alpha$-alumina tends to "ball," reducing the response to milling. After 30 minutes, 98.5% of the explosively treated material had a particle size smaller than 44$\mu$ while 50% of the untreated $\alpha$-alumina still had a particle size greater than 44$\mu$.

The average particle size of explosively treated $\alpha$-alumina dry-ball-milled for 1 hour was 2.81$\mu$ while that of the untreated powder was between 30 and 40$\mu$. After 4 hours the average particle size of the explosively treated material was between 0.1 and 1$\mu$ and that of the untreated $\alpha$-alumina was between 0.2 and 2$\mu$.

The diffraction line broadening, $\beta(d\ 2.09\ \text{A.})$, of the untreated powder was not affected by extended milling operations and remained unchanged at less than 0.03 degree $2\theta$ while that of the explosively treated material both before and after milling was about 0.28 degree $2\theta$. Samples of $\alpha$-alumina explosively treated as above using 15, 20, 25 and 40 grams per square inch of explosive, i.e., a weight ratio of explosive to powder of 2.51, 3.34, 4.23, and 6.67, respectively, gave $\beta(2.09\ \text{A.})=0.13, 0.20, 0.28$, and $0.35$ degree $2\theta$, respectively.

An analysis of the line broadening found with explosively treated $\alpha$-alumina, among others, is shown in FIGURE 9. The lines shown in the graph therein were obtained from the line broadening data, the points having been plotted by taking $\beta(d) \cos \theta$ as the ordinate and $\sin \theta$ as the abscissa, as described previously. The line for the explosively treated $\alpha$-alumina has a large positive slope (about 0.35) and intercepts the ordinate slightly above the origin, indicating the effect of lattice strain as well as small crystallite size on the line broadening. On the other hand, the line for the untreated powder is horizontal establishing the absence of strain.

EXAMPLE 2

A 114-gram sample of the $\alpha$-alumina used as a starting material in Example 1 was subjected to explosive treatment as shown in FIGURES 4a and 4b. The density of the powder as packed in the cavity prior to detonation was 1.05 grams per cubic centimeter or 26.5 percent of the crystalline density. The weight distribution of the explosive was 20 grams per square inch, giving a weight ratio of explosive to powder of 1.24.

The diffraction line broadening $\beta(2.09\ \text{A.})$ of the explosively treated material was 0.06 degree $2\theta$.

EXAMPLE 3

A 79-gram sample of colloidal $\alpha$-alumina containing a minor amount of $\theta$-alumina which was prepared by heating boehmite ($Al_2O_3 \cdot 1H_2O$) for 4 hours at 1200° C. in air in a silicon carbide resistance furnace was explosively treated using the assembly illustrated in FIGURE 2. The density of the powder as packed in the annulus prior to detonation was 0.585 gram per cubic centimeter or 14.8 percent of the crystalline density. The weight distribution of the explosive was 8 grams per square inch and the weight ratio of explosive to powder was 2.86.

After explosive treatment the sample was milled for 1½ hours. The apparent bulk density of the milled material was 1.1 grams per cubic centimeter while that of the unshocked colloidal α-alumina which was milled for the same length of time was only 0.45 gram per cubic centimeter.

EXAMPLE 4

A 216.5 gram sample of the untreated α-alumina used in Example 1 was explosively treated as shown in FIGURE 1 in the aluminum tube described above. The density of the powder as packed in the tube prior to detonation was 1.22 grams per cubic centimeter or 30.7 percent of the crystalline density. A sheet of an explosive composition having a weight distribution of about 2 grams per square inch (ratio of explosive to powder=0.26) and comprising 85 parts pentaerythritol tetranitrate and, as a binder, 15 parts of the mixture of butyl rubber and terpene resin described above was used in this example. The detonation velocity of this explosive is 7500 meters per second.

The shock velocity, $U_s$, and the material velocity, $U_m$, behind the shock front advancing into the powder were calculated from the known detonation velocity, $D$, of the explosive, the angle, $\theta_1$, between the original position of the tube wall prior to detonation and the position of the tube wall while deflected during the detonation, and the angle, $\theta_2$, between the original position of the tube wall and the shock front advancing into the α-alumina. These angles, measured directly from flash X-ray radiographs of the assembly taken prior to and during detonation, were 3.96° and 7.06°, respectively. $U_s$, which equals $D \tan \theta_1$, was 930 meters per second, and $U_m$, which equals $D \tan \theta_2$, was 520 meters per second. From the values of $U_s$ and $U_m$, the detonation velocity, $D$, and the known packed density, $\rho_0$, of the α-alumina prior to detonation, the shock pressure, $\Delta P$, was calculated according to the equation $$\Delta P = \rho_0 D^2 \tan \theta_1 \tan \theta_2$$

to be 5.8 kilobars.

The average density of the discrete fragments or lumps of the cracked, fractured egglomerate produced by explosive treatment was 2.73 grams per cubic centimeter or 69.2% of the crystalline density, and the broadening of the diffraction lines, $\beta(d\ 2.09\ A.)$, was 0.05 degree $2\theta$.

Ceramic compacts were fabricated from representative samples of explosively treated and untreated α-alumina using the ceramic techniques of milling, followed by cold-pressing and sintering or by hot-pressing.

A. The response of samples of treated and untreated α-alumina all of which were milled to a particle size smaller than 3.7μ, mixed with 13.7 weight percent water, and hydraulically pressed under 46,000 pounds per square inch pressure into circular dies ⅝ inch in diameter is shown in Table I.

TABLE I

| Condition of Sample | Diffraction Line Broadening $\beta(d\ 2.09\ A.)$ in degrees $2\theta$ | Pressed Thickness, in. | Pressed Density | |
|---|---|---|---|---|
| | | | G./cc. | Percent crystalline density |
| Untreated | <0.015 | .32 | 2.247 | 56.7 |
| Explosively treated | 0.13 | .27 | 2.524 | 64.0 |
| Do | 0.20 | .28 | 2.496 | 63.0 |
| Do | 0.28 | .27 | 2.532 | 63.8 |

The higher cold-pressed densities of samples of explosively treated material are believed to result from a more favorable particle size distribution.

B. Sintering of α-alumina is usually carried out at a temperature of about 1800 to 1950° C. However since differences in sintering rate among various samples would be expected to be most pronounced during the initial phase of sintering, cold-pressed samples of explosively treated and untreated α-alumina were sintered at 1300 and 1500° C. and the densities of the samples were measured after 15 and 240 minutes. The results are recorded in Table II.

TABLE II

| Condition of Sample | Cold Pressed Density, g./cc. | Sintering Temperature, ° C. | Percent Increase in Density, after— | | Sintered Density (g./cc.) after— | |
|---|---|---|---|---|---|---|
| | | | 15 min. | 240 min. | 15 min. | 240 min. |
| Explosively treated | 2.52 | 1,300 | 2.4 | 12.3 | 2.627 | 2.858 |
| Untreated | 2.25 | 1,300 | 2.1 | 7.0 | 2.299 | 2.398 |
| Explosively treated | 2.52 | 1,500 | 23.0 | 34.4 | 3.118 | 3.432 |
| Untreated | 2.25 | 1,500 | 12.7 | 39.8 | 2.256 | 3.138 |

As indicated in the table the cold-pressed density, the initial sintering rate, and the final density of the explosively treated material are greater than those of the untreated material. Further, the data for sintering at 1500° C. show that the shrinkage $$\left(\frac{\text{density}_{sintered} - \text{density}_{cold\ pressed}}{\text{density}_{sintered}}\right)$$

during sintering of explosively treated α-alumina is considerably less than that of untreated α-alumina.

C. A bar compact of α-alumina having a density near the crystalline density of the material was prepared by mixing a 5-gram sample of explosively treated, milled material with 0.5 gram of water, pouring the mixture into a rectangular die 2 inches long and 0.25 inch wide, hydraulically pressing the mixture in two pressing cycles, each of which applied maximum pressure of 32,000 pounds per square inch, drying the pressed bar under an infrared lamp, and sintering the bar for 2 hours at 1750° C. in an argon atmosphere. The response to cold-pressing and sintering of this bar and of a bar prepared under the same conditions from untreated β-alumina are given in Table III.

TABLE III

| Condition of Sample | Explosively Treated | Untreated |
|---|---|---|
| Diffraction Line Broadening $\beta(d\ 2.09\ A.)$ in degrees $2\theta$ | 0.28 | <0.01 |
| Thickness of Cold-Pressed Bar, in. | 0.24 | 0.27 |
| Density of Cold-Pressed Bar, g./cc. | 2.506 | 2.216 |
| Density of Sintered Bar, g./cc. | 3.76 | 2.93 |
| Transverse Rupture Strength of Sintered Bar, p.s.i. | 39,100 | 13,100 |

D. A bar compact of colloidal α-alumina was prepared by placing a 2-gram sample of explosively treated, milled material in a rectangular die 2 inches long and 0.25 inch wide, hydraulically pressing the sample under 40,000 pounds per square inch pressure, and sintering the bar for 1 hour at 1800° C. in vacuum. The response to cold-pressing and sintering of this bar and of a bar prepared under the same conditions from untreated colloidal α-alumina are given in Table IV. The bar made from untreated material warped considerably during sintering.

TABLE IV

| Condition of Sample | Explosively Treated | Untreated |
| --- | --- | --- |
| Density of Cold-Pressed Bar, g./cc. | 1.98 | 1.31 |
| Density of Sintered Bar, g./cc. | 3.74 | 3.48 |
| Transverse Rupture Strength of Sintered Bar, p.s.i. | 17,800 | 15,520 |

E. A series of samples of explosively treated and untreated α-alumina was hot-pressed for 1 hour at 1700° C. under 4000 pounds per square inch pressure. Of this series, 2 samples were dry-ball-milled for 1 hour to a particle size smaller than 75μ, 2 samples were ball-milled in water for 1 hour to a particle size smaller than 44μ, and 2 samples were wet-ball-milled for 1 hour in a solution of magnesium nitrate and then collected and dried yielding powders containing 1 weight percent of magnesium oxide. Magnesium oxide generally is employed as a grain-growth inhibitor in alumina ceramics. The densities and transverse rupture strengths of the hot-pressed samples are given in Table V.

TABLE V

| Condition of Sample | Milling Medium | Hot-Pressed Density, g./cc. | Hot-Pressed Transverse Rupture Strength, p.s.i. |
| --- | --- | --- | --- |
| Explosively treated | Dry | 3.96 | 45,600 |
| Untreated | Dry | 3.91 | 19,000 |
| Explosively treated | $H_2O$ | 3.97 | 23,900 |
| Untreated | $H_2O$ | 3.94 | 17,700 |
| Explosively treated | Aqueous $Mg(NO_3)_2$ solution. | 3.90 | 42,100 |
| Untreated | do | 3.93 | 30,900 |

In general, hot-pressed, or cold-pressed and sintered compacts made from explosively treated α-alumina are at least as dense as and are as much as 250 percent stronger than similar compacts made from untreated α-alumina.

F. A portion of an α-alumina powder containing 0.2% MgO was explosively shocked according to the process of this invention, and a second portion was used as a control. Each portion was ball-milled for the same period of time, and fabricated into bars by hydraulically pressing under 15,000 pounds per square inch pressure in a steel die. The bars were sintered in a vacuum induction furnace at different temperatures. The holding time after reaching the sintering temperature was 5 minutes in all cases. After the sintering treatment the density of the bars was measured. The results are shown in Table VI.

TABLE VI

| Sintering Temp. (° C.) | Density, g./cc. | |
| --- | --- | --- |
| | Shocked Powder | Unshocked Powder |
| 1,500 | 2.94 | 2.64 |
| 1,700 | 3.66 | 3.10 |
| 1,800 | 3.87 | 3.66 |
| 1,850 | 3.93 | 3.77 |

These results show that bodies made by sintering the magnesia-containing α-alumina powder of this invention in a vacuum for five minutes have considerably higher density than bodies made in the same manner from conventional powders, and that even when sintered for only five minutes at 1850° C. the novel powder has a density approaching theoretical (3.987 g./cc.).

EXAMPLES 5–15

A number of 116.7-gram samples of barium ferrite having a diffraction line broadening $\beta(d\ 2.77\ A.)$ of less than 0.03 degree $2\theta$ and an average particle size of about 5–10μ were subjected to explosive treatment as shown in FIGURE 1 using the stainless steel tube described above. The density of each of the samples as packed in a tube prior to detonation was about 3.38 grams per cubic centimeter or about 63.9 percent of the crystalline density. All detonations were carried out in air. The effects of the amount of explosive used and of repeated explosive treatment on the line broadening of the powder and on the density of the cracked agglomerate produced by explosive treatment are shown in Table VII.

TABLE VII

| Example | No. of Explosive Treatments | Weight Distribution of Explosive, g./sq. in. (total wt. ratio of explosive to powder) | Diffraction Line Broadening $\beta(d\ 2.77\ A.)$ of Treated $BaFe_{12}O_{19}$, in degrees $2\theta$ | Density of Agglomerate | |
| --- | --- | --- | --- | --- | --- |
| | | | | G./cc. | Percent Crystalline Density |
| 5 | 1 | 5 (0.53) | 0.06 | 4.3 | 81.0 |
| 6 | 1 | 10 (1.06) | 0.13 | 4.48 | 84.6 |
| 7 | 1 | 15 (1.59) | 0.19 | 4.60 | 86.8 |
| 8 | 1 | 20 (2.12) | 0.23 | 4.93 | 93.1 |
| 9 [1] | 2 | 10, 10 (2.12) | 0.20 | | |
| 10 | 1 | 25 (2.65) | 0.25 | 5.05 | 95.2 |
| 11 | 1 | 30 (3.18) | 0.27 | 5.09 | 96.0 |
| 12 [1] | 2 | 5, 25 (3.18) | 0.29 | | |
| 13 [1] | 2 | 15, 15 (3.18) | 0.28 | | |
| 14 [1] | 2 | 20, 20 (4.24) | 0.28 | | |
| 15 [1] | 3 | 20, 20, 20 (6.36) | 0.27 | | |

[1] Ground between treatments.

EXAMPLE 16

A 117.6-gram sample of the untreated barium ferrite used in the preceding examples was subjected to explosive treatment as shown in FIGURE 1 using the stainless steel tube described above. The density of the powder as packed in the tube prior to detonation was 3.41 grams per cubic centimeter or 64.3 percent of the crystalline density. The explosive employed in this example was a physical mixture of 80 parts granular trinitrotoluene and 20 parts granular ammonium nitrate which detonates at a velocity of approximately 5080 meters per second.

The sealed stainless steel tube containing the barium ferrite was positioned substantially concentrically within a thin-walled cardboard cylinder having a length of 7 inches, a diameter of approximately 2½ inches, and having a bottom but no top. The annulus between the outside wall of the stainless steel tube and the inside wall of the cardboard cylinder was filled with 537 grams of the explosive mixture giving a weight ratio of explosive to barium ferrite of 2.58.

The explosive was initiated by means of a disk of an explosive composition comprising 70 parts very fine pentaerythritol tetranitrate and, as a binder, 30 parts of the mixture of butyl rubber and terpene resin described above and having a weight distribution of 1⅛ grams per square inch. The disk of explosive which had dimensions corresponding to those of the cross-section of the cardboard container was laid on top of the open end of the container and initiated by means of a line-wave generator and electric blasting cap as in the preceding examples. Detonation was carried out under water.

The density of lumps of the fractured agglomerate was about 4.34 grams per cubic centimeter or 81.8 percent of the crystalline density and the diffraction line broadening $\beta(d\ 2.77\ \text{A.})$ of the sample was 0.19 degree $2\theta$.

The explosively treated material was milled dry for 4 hours using a steel mill and alumina balls to a powder having an average particle size in the range ½ to 5$\mu$. The range of the average particle size of the unshocked barium ferrite which was milled for the same length of time under the same conditions was between 1 and 8$\mu$.

Bars 2 inches long, 0.25 inch wide, and about 0.30 inch thick, and disks ⅝ inch and 1½ inches in diameter were fabricated from milled, explosively treated and untreated barium ferrite powders by (1) cold-pressing and sintering, (2) cold-pressing and soaking in epoxy resin, and (3) mixing with epoxy resin and cold-pressing.

Table VIII shows the relationship between forming pressure and cold-pressed density, and between cold-pressed density and sintered density for bars made by hydraulically cold-pressing explosively treated and untreated barium ferrite and sintering the cold-pressed compacts of varying lengths of time at a number of temperatures. The average line broadening $\beta(d\ 2.77\ \text{A.})$ of the explosively treated powder was 0.14 degree $2\theta$ and that of the untreated powder was less than 0.03 degree $2\theta$. The average particle size of both powders was smaller than 44$\mu$.

As is apparent in the tabular data the cold-pressed density of explosively treated barium ferrite is geater than that of untreated barium ferrite compacted under the same forming pressure. Conversely, a lower forming pressure is required to produce a cold-pressed compact of a given density from explosively treated barium ferrite than is required when the starting material is untreated barium ferrite. Further, the sintered density and transverse rupture strength of campacts made from explosively treated barium ferrite are greater than those of untreated barium ferrite whether the cold-pressed density of the compacts made from explosively treated material is the same as or greater than that of the compacts made from untreated material. This is the case over a wide range of sintering times and temperatures.

Permanent magnets were prepared by grinding thin flat rectangles 0.050 inch thick and about 0.285 inch on a side from sintered compacts prepared under the same conditions from explosively treated and untreated barium ferrite, placing each of the rectangles in the pickup coil of an electromagnet and subjecting it to a saturating field of about 10,000 oersteds. The magnetic properties, i.e., $B_R$, $_iH_c$, $_BH_c$, and $(BH)_{max}$, of the barium ferrite permanent magnets were measured using a recording flux density meter. Table IX lists the magnetic properties of explosively treated and untreated barium ferrite sintered at 1250° C. for varying lengths of time. The diffraction line broadening $\beta(d\ 2.77\ \text{A.})$ of the explosively treated material prior to sintering was about 0.23 degree $2\theta$ while that of the untreated material was less than 0.03 degree $2\theta$.

TABLE IX

| Sintering Time, min. | Explosively Treated | | | Untreated | | |
|---|---|---|---|---|---|---|
| | $B_R$, gauss | $_iH_c$, oersteds | $_BH_c$, oersteds | $B_R$, gauss | $_iH_c$, oersteds | $_BH_c$, oersteds |
| 10 | 2,280 | 2,870 | 1,840 | 2,020 | 2,870 | 1,580 |
| 20 | 2,050 | 2,880 | 1,650 | 1,930 | 2,760 | 1,510 |
| 30 | 2,330 | 2,810 | 1,850 | 2,210 | 2,740 | 1,630 |
| 60 | 2,350 | 2,940 | 1,930 | 2,140 | 2,710 | 1,610 |
| 90 | 2,370 | 2,840 | 1,855 | 2,300 | 2,750 | 1,685 |

The best permanent magnets were prepared by magnetizing compacts made from explosively treated barium ferrite having an average $\beta(d\ 2.77\ \text{A.})$ of 0.14 degree $2\theta$ and an average particle size smaller than 150$\mu$ which compacts had been sintered at 1250° C. for about 10 to 30 minutes. For example, a sample of explosively treated barium ferrite having a line broadening $\beta(d\ 2.77\ \text{A.})$ $=0.14$ degree $2\theta$ and an average particle size smaller than 75$\mu$ which was cold-pressed under 13,100 pounds per square inch pressure, sintered at 1250° C. for 10 minutes, and magnetized as described above had $B_R$ equal to 2640 gauss, $_iH_c$ equal to 2800 oersteds, $_BH_c$ equal to 2040 oersteds, and $(BH)_{max}$ equal to $1.44\times10^6$ gauss-oersteds. The corresponding values for the best permanent magnet prepared under the same conditions from untreated barium ferrite were 2340 gauss, 2780 oersteds, 1775 oersteds, and $1.14\times10^6$ gauss-oersteds, respectively.

The magnetic properties of permanent magnets prepared by magnetizing compacts obtained by cold-pressing explosively treated barium ferrite, soaking the cold-pressed material in epoxy resin and drying and curing the resin, and by cold-pressing mixtures of explosively treated barium ferrite and epoxy resin prior to drying and curing the resin also were superior to those prepared under the same conditions from untreated barium ferrite.

The superior magnetic properties of the novel barium ferrite powder of this invention are believed to be attributable to the fact that the X-ray diffraction line broad-

TABLE VIII

| Condition of Sample | Explosively Treated | | Explosively Treated | | Untreated | |
|---|---|---|---|---|---|---|
| Forming Pressure, p.s.i. | 16,000 | | 24,000 | | 24,000 | |
| Cold-Pressed Density, g./cc. | 3.43 | | 3.63 | | 3.45 | |
| Sintering Temperature, ° C. | Sintering Time, min. | Sintered Density, g./cc. | Transverse Rupture Strength, p.s.i. | Sintered Density, g./cc. | Transverse Rupture Strength, p.s.i. | Sintered Density, g./cc. | Transverse Rupture Strength, p.s.i. |
| 1,100 | 15 | | | | 6,200 | | 2,000 |
| 1,100 | 240 | 4.16 | 4,320 | 4.26 | 10,600 | 3.84 | 1,850 |
| 1,250 | 15 | 4.79 | | | 11,100 | 4.48 | 9,400 |
| 1,250 | 60 | 4.93 | | | | 4.64 | |
| 1,250 | 120 | 4.89 | 17,150 | 5.02 | 24,400 | 4.67 | 9,800 |
| 1,250 | 240 | 5.09 | | | 24,000 | 4.86 | 9,900 | ening, indicative of lattice strain and small crystallite size, found with this powder persists even after sintering. The line broadening obtained with this powder is greater than that obtained with untreated, unsintered barium ferrite and generally $\beta(d\ 2.77\ A.)$ is greater than 0.05 degree $2\theta$. A comparison of the diffraction line broadening of samples of explosively treated barium ferrite before and after sintering at 1200° and 1300° C. for varying lengths of time is given in Table X.

TABLE X

| $\beta(d\ 2.77\ A.)$ in degrees $\theta$ Before Sintering | Sintering Temperature, °C. | Sintering Time, min. | $\beta(d\ 2.77\ A.)$ in degrees $2\theta$ After Sintering |
|---|---|---|---|
| 0.23 | 1,300 | 2.5 | 0.08 |
| 0.23 | 1,300 | 4 | 0.06 |
| 0.19 | 1,200 | 30 | 0.06 |
| 0.13 | 1,300 | 10 | 0.05 |

EXAMPLE 17

A 251.7-gram sample of black silicon carbide having an average line broadening $\beta(d\ 2.52\ A.)$ of less than 0.03 degree $2\theta$ and an average particle size of $100\mu$ was explosively treated using the assembly illustrated in FIGURE 2. The density of the powder as packed in the annulus before detonation was 1.85 grams per cubic centimeter or 57.8 percent of the crystalline density. The weight distribution of the explosive was 12 grams per square inch, and the weight ratio of explosive to powder was 1.34. The line broadening $\beta(d\ 2.52\ A.)$ of the explosively treated material was 0.05 degree $2\theta$ and the color of the fractured agglomerate was light gray. This change in color from the very dark gray or black of the untreated material indicates that explosive treatment produced an agglomerate of silicon carbide of reduced particle size since an increase in the ratio of reflected to absorbed light corresponds to a decrease in particle size.

Table XI gives the physical properties and impurity levels of a sample of the explosively treated silicon carbide and a sample of the untreated silicon carbide after both samples were milled for 5 minutes. The impurity levels were determined by emission spectroscopy.

TABLE XI

| Condition of Sample | Explosively Treated | Untreated |
|---|---|---|
| Particle Size, $\mu$ | ½–6 | 10–40 |
| Specific Surface Area, sq. m./g. | 3.0–6.2 | 0.4–1.6 |
| Apparent Bulk Density, g./cc. | 1.62 | 1.70 |
| Percent Oxygen | 1.1 | 1.0 |
| Percent Carbon | 28.1 | 27.8 |
| Percent Silicon | 65.4 | 64.0 |

As is apparent in the table, explosive treatment allowed production of very fine silicon carbide powder without an attendant substantial increase in impurity levels (oxygen content indicates how much $SiO_2$ is present), and "fluffiness" generally associated with fine powders. In fact, the apparent density of untreated silicon carbide powder having the same particle size as the above explosively treated sample would be expected to be about 1.1 g./cc. The explosively treated powder was reduced to a particle size between 0.5 and $2\mu$ after an additional 25 minutes of milling.

EXAMPLE 18

A 235-gram sample of green silicon carbide having an average particle size range between 10 and $44\mu$ and a line broadening $\beta(d\ 2.52\ A.)$ of less than 0.03 degree $2\theta$ was explosively treated as shown in FIGURE 3. The explosive used in this example was a 30-gram cord of an extruded explosive composition comprising 75 parts very fine pentaerythritol tetranitrate and, as a binder, 25 parts of the mixture of butyl rubber and terpene resin described above. The weight ratio of explosive to powder was 0.082. This composition detonates at a velocity of about 6000 meters per second.

After explosive treatment the line broadening $\beta(d\ 2.52\ A.)$ of the silicon carbide was about 0.04 degree $2\theta$. The material had changed in color from dark green to light tan indicating that an extensive reduction in particle size had taken place.

The explosively treated sample was hand-ground for 1 minute using a mortar and pestle to a powder having an average particle size between ½ and $4\mu$, a specific surface area as determined by nitrogen adsorption of about 3.6 square meters per gram, and an apparent bulk density of 1.78 grams per cubic centimeter. These values for the silicon carbide starting material which was not explosively treated but which was also hand ground for 1 minute were 10 to $44\mu$, 0.4 to 1.9 square meters per gram, and 1.7 grams per cubic centimeter, respectively.

EXAMPLES 19–23

60-gram samples of green silicon carbide having a particle size range between 165 and $406\mu$ and a line broadening $\beta(d\ 2.52\ A)$ of less than 0.02 degree $2\theta$ were subjected to explosive treatment as shown in FIGURE 1 using the stainless steel tube described above. The weight distribution of the explosive was varied between 10 and 40 grams per square inch, and the packed density of the silicon carbide before detonation was 1.74 g./cc. After detonation the color of each of the samples had changed from dark green to light tan indicating extensive reduction of the particle size. The effect of the amount of explosive used on the X-ray diffraction line broadening of the powder is shown in Table XII.

TABLE XII

| Example | Weight Distribution of Explosive, g./sq. in. (Total Wt. Ratio of Explosive to Powder) | Diffraction Line Broadening $\beta(d\ 2.52\ A.)$ in degrees $2\theta$ |
|---|---|---|
| 19 | 10 (2.06) | 0.04 |
| 20 | 15 (3.09) | |
| 21 | 20 (4.12) | 0.10 |
| 22 | 30 (6.18) | 0.15 |
| 23 | 40 (8.23) | 0.26 |
| Untreated SiC | | <0.02 |

FIGURE 6 in which the weight percent of a given sample of silicon carbide having an average particle size smaller than $44\mu$ is plotted against time compares the rate and extent of particle size reduction of explosively treated silicon carbide (Example 20) and a sample of the untreated powder subjected to wet (water medium) and dry ball-milling operations. Curve 1 exhibits the slow and steady decrease in particle size with milling time expected in conventional grinding processes in which interatomic bonds within the relatively large particles of untreated silicon carbide are broken. Curves 2 and 3 correspond to deagglomeration of very fine particles of silicon carbide. For example, after only 5 minutes of dry ball-milling, 85 percent of the explosively treated powder had a particle size smaller than $44\mu$ and, for the most part, between ½ and $6\mu$.

Table XIII gives the average particle size, specific surface area as determined by nitrogen adsorption, and impurity levels as determined by emission spectroscopy of the relatively fine silicon carbide (starting material, Example 18), the relatively coarse silicon carbide (starting material, Example 19), both explosively treated and untreated, after milling for various lengths of time.

TABLE XIII

| Condition of Sample | Milling Time | Particle Size, $\mu$ | Specific Surface Area, sq. m./g. | Percent Al | Percent Fe |
|---|---|---|---|---|---|
| Untreated | 0 | 165–406 | 0.35 | 0.02 | 0.03 |
| Do | 0 | 10–44 | | 0.05 | 0.10 |
| Do | 5 min | (1) | 0.42 | 0.03 | 0.02 |
| Do | 1 hr | (1) | 0.63 | 0.05 | 0.04 |
| Do | 24 hr | 100–350 | 0.56 | 0.40 | 0.05 |
| Explosively treated | 5 min | ½–6 | 4.00 | 0.03 | 0.07 |
| Do | 1 hr | ½–4 | 3.80 | 0.005 | 0.01 |

[1] Most 165–406.

As is apparent in the table the explosively treated silicon carbide was reduced to an extremely fine powder in a very short time (5 min.) with essentially no change in the impurity level which remained below that of the relatively fine (10–44μ) powder produced by conventional means. On the other hand, after 24 hours of milling most of the particles in the untreated sample were larger than 100μ and the aluminum pick-up from the mill was noticeable.

EXAMPLE 24

A 188.6-gram sample of the untreated silicon carbide used in Examples 19–23 was explosively treated as shown in FIGURES 4a and 4b. The density of the powder as packed in the cavity prior to detonation was 1.74 grams per cubic centimeter or 54 percent of the crystalline density. The weight distribution of the explosive was 15 grams per square inch and the ratio of explosive to carbide was 0.56.

After explosive treatment the line broadening $\beta(d\ 2.52\ \text{A.})$ of the silicon carbide was about 0.04 degree $2\theta$ and the color of the sample had changed from dark green to light tan indicating extensive particle size reduction. The cracked agglomerate was milled for 1 hour to a powder having an average particle size between 0.5 and 6μ and a specific surface area of 3.7 square meters per gram. These values for the untreated silicon carbide after milling for the same length of time were 165 and 406μ and 0.30 square meter per gram, respectively.

Explosively treated silicon carbide was evaluated for use as a loose abrasive powder of fine particle size and in the form of ceramic compacts fabricated by conventional hot-pressing, and cold-pressing and sintering techniques.

A. The surface of a sintered cermet comprising 85 parts tungsten carbide cemented by 15 parts cobalt was polished to a high finish using diamond paste. The surface then was "repolished" using a water suspension of silicon carbide having an average particle size between 10 and 44μ (starting material in Example 18) and a conventional metallographic polishing lap. Microscopic examination revealed the presence of deep scratches produced by the silicon carbide in the polished surface of the cermet. The scratched surface then was repolished under the same conditions used with the 10 to 44μ particle size silicon carbide. However the silicon carbide used in this operation was the powder having an average particle size between ½ and 4μ produced by explosive treatment and deagglomeration as in Example 18. This third polishing operation removed the scratches produced by the untreated silicon carbide and restored the surface of the cermet to substantially the same high finish achieved using diamond paste.

B. A sample of the explosively treated silicon carbide having a line broadening $\beta(d\ 2.52\ \text{A.})$ of 0.05 degree $2\theta$ and an average particle size range of ½ to 6μ produced by explosive treatment and ball milling for 5 minutes as in Example 17 was cold pressed under 40,000 pounds per square inch hydraulic pressure. The density of the cold-pressed compacts thus prepared was 2.13 grams per cubic centimeter and the compacts were sufficiently strong to be handled easily without crumbling. The density of compacts made by cold-pressing the untreated silicon carbide after ball-milling for the same length of time was only 1.88 grams per cubic centimeter and the compacts crumbled unless handled with the utmost care.

C. The above compacts made from explosively treated silicon carbide as well as the compacts made from untreated silicon carbide were sintered in hydrogen at different temperatures. The holding time after attainment of the sintering temperature was 15 minutes in all cases. The transverse rupture strength of the compacts was measured. As shown in Table XIV, the sintered compacts made from shocked powder were significantly stronger than those made from unshocked powder.

TABLE XIV

| Sintering Temp. (° C.) | Transverse Rupture Strength, p.s.i. | |
|---|---|---|
| | Shocked Powder | Unshocked Powder |
| 1,900 | 4,000 | 200 |
| 2,000 | 7,300 | 500 |
| 2,100 | 9,200 | 2,900 |
| 2,200 | 8,700 | 2,500 |
| 2,300 | 6,700 | 2,000 |
| 2,400 | 7,800 | 4,600 |

The density of the sintered compacts made from shocked silicon carbide ranged from 1.95 to 2.03 g./cc., whereas that of compacts made from the unshocked carbide ranged from 1.75 to 1.80 g./cc.

D. Similar results were obtained with compacts made by hot-pressing explosively treated and untreated powders at 2100° C. under 4000 pounds per square inch pressure. The transverse rupture strength of the compact made from explosively treated silicon carbide was 9900 pounds per square inch while that of the compact made from untreated silicon carbide was only 5750 pounds per square inch. The higher strength of sintered bodies made from explosively treated powder can be attributed to the higher sintered density and smaller grain size of these materials.

Silicon carbide powders prepared substantially as above by the process of this invention will have a particle size between 0.5 and 150 microns and an X-ray diffraction line broadening $\beta(d\ 2.52\ \text{A.})$ of about from 0.04 to 0.40 degree $2\theta$.

EXAMPLE 25

A 124-gram sample of boron carbide having a line broadening $\beta(d\ 2.38\ \text{A.})$ of 0.22 degree $2\theta$ and an average particle size range between 6 and 12μ was subjected to explosive treatment as shown in FIGURE 2. The density of the sample as packed in the annulus prior to detonation was 0.925 gram per cubic centimeter or 37.0 percent of the crystalline density. The weight distribution of the explosive was 12 grams per square inch and the ratio of explosive to sample was 2.73.

After detonation the line broadening $\beta(d\ 2.38\ \text{A.})$ of the material was 0.26 degree $2\theta$ and the color of the sample had changed from black to dark brown indicating extensive particle size reduction. The explosively treated material then was milled for ½ hour to a powder having an average particle size range between ½ and 5μ and an apparent bulk density of 0.73 gram per cubic centimeter. The average particle size of the untreated boron carbide after milling for the same length of time remained unchanged at 6 to 12μ and the apparent bulk density of this coarser powder after milling was 0.60 gram per cubic centimeter.

A 41.4 gram sample of the explosively treated, milled boron carbide was subjected to a second explosive treatment as shown in FIGURE 1 using the stainless steel tube described above. The weight distribution of the explosive was 20 grams per square inch, giving a ratio of explosive to carbide of 5.65, and detonation was carried out under water. This second explosive treatment did not change the line broadening $\beta(d\ 2.38\ \text{A.})$ of the sample substantially from the 0.26 degree $2\theta$ determined after the first treatment.

The boron carbide then was milled for ½ hour to a powder having an average particle size between 0.1 and 2μ and a specific surface area determined by nitrogen adsorption of 8.4 square meters per gram. A sample of the untreated boron carbide after milling twice for ½ hour was milled for a second ½ hour. The average particle size of the material remained unchanged at 6 to 12μ and the specific surface area was 2.1 square meters per gram.

Tests similar to those used for evaluating explosively treated silicon carbide were carried out using explosively treated boron carbide.

A. A sintered tungsten carbide cermet cemented by cobalt was polished to a high finish using diamond paste. The polished surface then was "repolished" using a water suspension of boron carbide having an average particle size range between 6 and 12μ. This operation produced deep pits and scratches in the surface. A third polishing operation carried out using boron carbide having an average particle size of ½ to 2μ produced by two explosive treatment and deagglomeration cycles as in Example 25 removed the scratches and reduced the size of the pits in the surface of the cermet. The explosively treated powder probably would have to be graded into a very narrow particle size range in order to remove the pits completely. However these tests indicate that explosively treated boron carbide powder is a suitable substitute for diamond paste in many polishing and lapping applications.

B. Three-gram samples of boron carbide having an average line broadening $\beta(d\ 2.38\ \text{A.})$ of about 0.26 degree $2\theta$ and an average particle size between ½ and 5μ prepared by explosive treatment and deagglomeration as in Example 25 were mixed with 0.03 gram of paraffin, poured into a die 2 inches long and 0.25 inch wide and pressed under 40,000 pounds per square inch hydraulic pressure into a firm bar having a density of 1.45 grams per cubic centimeter. Bars prepared under the same conditions from three-gram samples of the untreated boron carbide which had been milled for ½ hour showed a marked tendency to crumble when removed from the die. The cold-pressed density of these bars was not determined since they disintegrated upon spray application of enamel used to keep water out of the pores of the bar during the density determination.

C. The bars made from the shocked boron carbide as well as those made from untreated boron carbide (paragraph B) were sintered in argon at 2200° C. for different lengths of time. The transverse rupture strength of the bars and their density were determined after sintering. The results, given in Table XV, show that the bars made from the shocked powder had higher strengths and densities than those made from the untreated material.

TABLE XV

| Sintering Time (minutes) | Transverse Rupture Strength, p.s.i. | | Density, g./cc. | |
|---|---|---|---|---|
| | Shocked Powder | Unshocked Powder | Shocked Powder | Unshocked Powder |
| 5 | 16,000 | 3,500 | 1.77 | 1.43 |
| 15 | 21,500 | 8,000 | 1.92 | 1.52 |
| 30 | 23,000 | 7,500 | 1.95 | 1.65 |
| 240 | 26,000 | 13,000 | 2.05 | 1.76 |

Boron carbide powders prepared by the process of this invention generally have an average particle size between about 0.5 to 150 microns and an X-ray diffraction line broadening $\beta(d\ 2.38\ \text{A.})$ of about from 0.25 to 0.35 degree $2\theta$.

EXAMPLE 26

A 261-gram sample of magnesium oxide having an X-ray diffraction line broadening $\beta(d\ 2.10\ \text{A.})$ of less than 0.03 degree $2\theta$ and an average particle size smaller than 150μ was subjected to explosive treatment as shown in FIGURE 2. The density of the powder as packed in the annulus prior to detonation was 1.93 grams per cubic centimeter or 54 percent of the crystalline density and the weight distribution of the explosive was 12 grams per square inch. The ratio of explosive to magnesium oxide was 1.33. Table XVI gives a comparison of the properties of the explosively treated and untreated samples after milling for various lengths of time.

TABLE XVI

| Condition of Sample | Milling Time, hrs. | $\beta(d\ 2.10\ \text{A.})$ in degrees $2\theta$ | Particle Size, μ | Specific Surface Area, sq. m./g. | Apparent Bulk Density, g./cc. |
|---|---|---|---|---|---|
| Untreated | 2 | <0.03 | ½–50 | 3.5 | 1.87 |
| Explosively treated | 2 | 0.17 | ½–8 | 4.0 | 1.62 |
| Untreated | 4 | <0.03 | ½–50 | | 1.47 |
| Explosively treated | 4 | 0.71 | ½–2 | | 1.22 |

After milling for 2 hours a sample of the explosively treated powder was subjected to a second explosive treatment using the assembly illustrated in FIGURE 1 and a weight distribution of explosive of 20 grams per square inch. This second treatment increased the line broadening $\beta(d\ 2.10\ \text{A.})$ of the magnesium oxide to 0.25 degree $2\theta$ but did not change substantially the response of the material to milling.

The X-ray diffraction line broadening data on the once-shocked magnesium oxide and the data on the same material unshocked were analyzed as described previously, and the $\sin \theta$ and $\beta(d) \cos \theta$ values plotted in the graph of FIGURE 9 as described previously in Example 1. The magnesia powder of the invention gives a line having a large positive slope (about 0.33) and intercepting the ordinate above the origin, showing the effect of lattice strain as well as small crystallite size on the line broadening. On the other hand, the untreated powder gives a horizontal line indicating the absence of strain and that line broadening is due to small crystallite size alone.

Several samples of explosively treated and untreated magnesium oxide which were milled for 2 hours were hydraulically pressed under 40,000 pounds per square inch pressure into bars having a density of about 2.47 grams per cubic centimeter. These bars then were sintered in air at various temperatures for varying lengths of time. For each sintering operation a bar was inserted into the furnace which was preheated to the desired temperature and removed from the furnace for testing at the end of the prescribed time interval. Table XVII gives the densities and transverse rupture strengths of the sintered bars and FIGURE 7 shows the relative sintering rates of explosive treated and untreated magnesium oxide at different temperatures. In FIGURE 7 the percent volume shrinkage is equal to the $$\left( \frac{\text{density}_{sintered} - \text{density}_{cold-pressed}}{\text{density}_{sintered}} \right) \times 100$$

TABLE XVII

| Condition of MgO | Sintering Temperature, °C | Sintering Time, min. | Density, g./cc. | Transverse Rupture Strength, p.s.i. |
|---|---|---|---|---|
| Explosively treated | (1) | ---------- | 2.47 | ------------ |
| Untreated | (1) | ---------- | 2.47 | ------------ |
| Explosively treated | 1,210 | 15 | 2.63 | 13,600 |
| Untreated | 1,210 | 15 | 2.55 | 13,500 |
| Explosively treated | 1,210 | 30 | 2.67 | ------------ |
| Untreated | 1,210 | 30 | ---- | ------------ |
| Explosively treated | 1,210 | 125 | 2.72 | ------------ |
| Untreated | 1,210 | 125 | 2.60 | ------------ |
| Explosively treated | 1,210 | 290 | 2.76 | ------------ |
| Untreated | 1,210 | 290 | 2.65 | ------------ |
| Explosively treated | 1,390 | 15 | 2.72 | 13,200 |
| Untreated | 1,390 | 15 | 2.62 | 4,200 |
| Explosively treated | 1,390 | 30 | 2.77 | ------------ |
| Untreated | 1,390 | 30 | 2.65 | ------------ |
| Explosively treated | 1,390 | 120 | 2.87 | ------------ |
| Untreated | 1,390 | 120 | 2.76 | ------------ |
| Explosively treated | 1,390 | 270 | 2.91 | ------------ |
| Untreated | 1,390 | 270 | 2.74 | ------------ |
| Explosively treated | 1,500 | 210 | 2.91 | ------------ |
| Untreated | 1,500 | 210 | 2.72 | ------------ |
| Explosively treated | 1,950 | 60 | 3.01 | 13,400 |
| Untreated | 1,950 | 60 | 2.48 | 6,500 |

[1] No sintering treatment.

From the tabulated and graphed data it is obvious that the initial sintering rate of the strained magnesium oxide powder of this invention is much higher than that of the strain-free material and that the ultimate density and strength of sintered compacts made from our magnesium oxide are greater than those made from the strain-free material.

Magnesium oxide powders prepared by the process of this invention generally have an average particle size between about 0.5 and 150 microns and an X-ray diffraction line broadening $\beta(d\ 2.10\ A.)$ ranging about from 0.05 to 0.40 degrees $2\theta$.

EXAMPLE 27

An 837-gram sample of zirconia (doped with 3.52 weight percent calcium oxide) having a line broadening $\beta(d\ 2.83\ A.)$ of 0.04 degree $2\theta$ and an average particle size smaller than 150μ was explosively treated as shown in FIGURE 1 using the cold-rolled steel tube described above. The density of the powder as packed in the tube prior to detonation was 3.64 grams per cubic centimeter or about 63.8 percent of the crystalline density. The weight distribution of the explosive was 20 grams per square inch, giving a weight ratio of explosive to powder of 0.56, and detonation was carried out in air. After detonation the line broadening $\beta(d\ 2.83\ A.)$ of the material was 0.12 degrees $2\theta$.

Table XVIII gives a comparison of the particle sizes of the explosively treated zirconia and the untreated zirconia at several points during their respective milling processes.

TABLE XVIII

| Milling Time, min. | A — Weight Percent Smaller than 45μ | | B — Weight Percent of A Smaller than 20μ | |
|---|---|---|---|---|
| | Explosively treated | Untreated | Explosively treated | Untreated |
| 30 | 52.1 | 26.5 | 62 | 21 |
| 60 | 70.3 | 47.6 | 66 | 34 |
| 90 | 91.5 | 64.9 | 82 | 38 |
| 120 | 99.8 | 88.8 | 84.4 | 43 |

EXAMPLES 28–32

Samples of barium titanate, titanium carbide, tungsten carbide, molybdenum disilicide, and a mixture of 92 parts colloidal α-alumina, 7 parts silicon carbide, and 1 part magnesium oxide were subjected to explosive treatment as shown in FIGURE 2 and the fractured agglomerates then were milled for various lengths of time to produce fine ceramic powders. The conditions under which the explosive treatment and milling were carried out and some physical properties of the explosively treated and untreated powders are given in Table XIX.

TABLE XIX

| | Example | | | | | | | | |
|---|---|---|---|---|---|---|---|---|---|
| | 28 | 29 | | 30 | | 31 | | 32 | |
| Composition | BaTiO$_3$ $\beta(d\ 2.32\ A.)$ =deg. $2\theta$ | TiC $\beta(d\ 2.17\ A.)$ =deg. $2\theta$ | | WC $\beta(d\ 2.52\ A.)$ =deg. $2\theta$ | | MoSi$_2$ $\beta(d\ 2.26\ A.)$ =deg. $2\theta$ | | α-Al$_2$O$_3$/SiC/MgO | |
| Initial line broadening, β | 0.02 | 0.03 | 0.03 | 0.03 | 0.03 | 0.05 | 0.05 | ------ | ------ |
| Initial Particle Size, μ | 75–150 | <7 | <7 | 2–7 | 2–7 | ½–15 | ½–15 | ------ | ------ |
| Packed Density, g./cc | 3.22 | 1.87 | ------ | 4.73 | ------ | 3.42 | ------ | 0.66 | ------ |
| Explosive Treatment | (1) | (1) | (2) | (1) | (2) | (1) | (2) | (1) | (2) |
| Weight Distribution of Explosive, g./sq. in | 15 | 10 | ------ | 12 | ------ | 12 | ------ | 8 | ------ |
| Weight Ratio of Explosive to Powder | 1.1 | 1.26 | ------ | 0.60 | ------ | 0.83 | ------ | 2.86 | ------ |
| Milling Time, hrs | 4 | [3] 3 | [3] 3 | [3] 16 | [3] 16 | ------ | ------ | 16 | 16 |
| Final Line Broadening, β | 0.19 | 0.08 | 0.03 | 0.11 | 0.03 | 0.21 | 0.05 | ------ | ------ |
| Final Particle Size, μ | <44 | ½–3 | 1–7 | ½–3 | 2–7 | ------ | ------ | ------ | ------ |
| Final Specific Surface Area, sq. m./g | ------ | 6.1 | 4.2 | ------ | ------ | ------ | ------ | ------ | ------ |
| Apparent Density of Milled Powder, g./cc | ------ | 1.64 | 1.53 | 4.95 | 3.36 | ------ | ------ | 0.75 | 0.59 |

[1] Yes.
[2] No.
[3] Stainless steel mill, sintered tungsten carbide balls, benzene medium.

The density of lumps of the fractured agglomerate produced by explosive treatment of barium titanate (Example 28) was 5.45 grams per cubic centimeter or 90.6 percent of the crystalline density.

It is apparent from the data in Table XIX that explosive treatment produces a pronounced broadening of the X-ray diffraction lines of the brittle materials exemplified as well as a reduction in particle size after milling to produce a powder having a higher density than that of unshocked powder milled for the same time.

The X-ray diffraction line broadening data on the shocked and unshocked titanium carbide of Example 29 were analyzed as described previously, and the sin $\theta$ and $\beta(d)$ cos $\theta$ values plotted in the graph of FIGURE 9 as described previously in Examples 1 and 26. The titanium carbide powder of the invention gives a line having a large positive slope (about 0.39) and intercepting the ordinate above the origin, showing the effect of lattice strain as well as small crystallite on the line broadening. On the other hand, the untreated powder gives a horizontal line indicating the absence of strain and that line broadening is due to small crystallite size alone.

Several samples of titanium carbide, in addition to the sample described in Example 29, were explosively treated using various amounts of explosive. The initial line broadening $\beta(d\ 2.17\ \text{A.})$ of these samples was less than 0.03 degree $2\theta$, and the final $\beta(d\ 2.17\ \text{A.})$ was between 0.09 and 0.10 degree $2\theta$.

Titanium carbide powders prepared by the process of this invention usually will have an average particle size between about 0.5 and 150 microns and an X-ray diffraction line broadening $\beta(d\ 2.17\ \text{A.})$ of about from 0.05 to 0.30 degree $2\theta$.

A 2-gram sample of the explosively-treated, milled material of Example 32 and a 2-gram sample of the untreated, milled material were poured into dies 2 inches long and 0.25 inch wide and hydraulically pressed under 40,000 pounds per square inch pressure. The cold-pressed density of the explosively treated sample was 1.98 grams per cubic centimeter and that of the untreated sample was 1.47 grams per cubic centimeter. These two bars were heated in vacuum for 2 hours at 1800° C. The sintered density of the explosively treated ceramic mixture was 2.42 grams per cubic centimeter and the transverse rupture strength was 8,450 pounds per square inch. This bar did not warp to any appreciable extent during sintering. The corresponding values for the untreated mixture were 2.17 grams per cubic centimeter and 5,680 pounds per square inch, respectively. This bar warped noticeably during sintering.

The physical properties of cold-pressed compacts and the physical and dielectric properties of cold-pressed and sintered compacts and of hot-pressed compacts made from barium titanate which was explosively treated and milled essentially as described above and of untreated barium titanate which was milled for the same length of time were determined. The line broadening $\beta(d\ 2.32\ \text{A.})$ of the explosively treated material prior to sintering was about 0.11 degree $2\theta$.

Several samples of the explosively treated and untreated powders were hydraulically pressed into bars 2 inches long, 0.25 inch wide and about 0.25 inch thick and into disks 1½ inches and ⅝ inch in diameter. The average cold-pressed densities of the bars and disks are listed in Table XX.

TABLE XX

| Condition of Sample | Density of Bars | | Density of Disks | |
| --- | --- | --- | --- | --- |
| | G./cc. | Percent Crystalline density | G./cc. | Percent Crystalline density |
| Explosively treated | 4.06 | 67.3 | 4.15 | 68.8 |
| Untreated | 3.58 | 59.3 | 3.57 | 59.2 |

The bars and disks were sintered under varying conditions of time and temperature in air under the positive pressure provided by an aspirator pulling air through the furnace. The samples were placed in the furnace at room temperature, brought to temperature in 2½ to 4 hours, held at temperature for the desired time, and furnace-cooled at a rate of about 2 or 3° C. per minute. The density and dielectric constant, E', of each of several sintered disks are given in Table XXI. The dielectric constant, E', of each sample was obtained by making the disk into a simple capacitor, measuring the capacitance on a General Radio Type 716–C bridge and calculating E' using the equation $$E' = \frac{C}{C_0}$$

where C is capacitance of the sample in micromicrofarads and $C_0$ is capacitance of air in micromicrofarads. All measurements were made at a frequency of one kilocycle, a field strength of 0.5 volt per centimeter, and a temperature of 24° C.

TABLE XXI

| Sintering Temperature, °C. | Sintering Time, min. | Sintered Density, g./cc. | | Dielectric Constant | |
| --- | --- | --- | --- | --- | --- |
| | | Explosively treated | Untreated | Explosively treated | Untreated |
| 1,080 | 60 | 5.68 | 5.64 | 1,700 | 1,630 |
| 1,100 | 240 | 5.58 | 5.48 | 2,425 | 2,170 |
| 1,125 | 60 | 5.49 | 5.46 | 2,070 | 1,630 |
| 1,210 | 60 | 5.51 | 5.42 | 2,010 | 1,840 |
| 1,250 | 60 | 5.49 | 5.41 | 2,050 | 2,010 |
| 1,300 | 60 | 5.46 | 5.43 | 2,085 | 1,810 |

As is apparent in the tabulated data sintered bodies made from explosively treated barium titanate had higher densities and dielectric constants than did bars made from untreated barium titanate sintered under the same conditions. Similar results were observed with samples hot-pressed at 1200 and 1300° C. for 10 minutes under 4000 pounds per square inch hydraulic pressure. Further, the grain size of explosively treated, sintered and hot-pressed barium titanate was smaller than that of untreated material processed under similar conditions.

EXAMPLE 33

Several samples of bismuth telluride having a line broadening $\beta(d\ 2.03\ \text{A.})$ of 0.06 degree $2\theta$ were subjected to explosive treatment as shown in FIGURE 1 using the stainless steel tube described above. The density of the powder samples as packed in the tubes before detonation varied between about 5.11 and 6.36 grams per cubic centimeter or 65 and 81 percent of the crystalline density. Only relatively small amounts of explosive could be used because of the low melting point (585° C.) of the bismuth telluride. For the particular geometric configuration used, the most satisfactory weight distribution of explosive was 5 grams per square inch (explosive/powder=0.28–0.35). Ten grams per square inch produced incipient recrystallization at the center of the tube and 15 grams per square inch caused extensive melting and recrystallization. The best results were obtained by repeatedly subjecting a given tube to explosive treatment using a weight distribution of explosive of 5 grams per square inch for each treatment. The largest line broadening was produced during the second treatment, and after the second treatment the material began to absorb enough thermal energy to cause annealing. The density of lumps of the fractured agglomerate of bismuth telluride increased with each treatment. These results are recorded below in Table XXII.

TABLE XXII

| Number of Explosive Treatments at 5 g./sq. in. per treatment | Line Broadening $\beta(d\ 2.03\ \text{A.})$ in degrees $2\theta$ | Density of "Lumps" of agglomerate, g./cc. |
| --- | --- | --- |
| 1 | 0.13 | 7.44 |
| 2 | 0.26 | 7.63 |
| 3 | 0.17 | 7.72 |
| 4 | 0.15 | 7.81 |

In order to analyze the effects of explosive treatment on the thermal and electrical properties of bismuth telluride, several samples of the explosively treated and untreated material which had been milled to powders having average particle sizes smaller than 44μ were cold pressed into bars 2 inches long, 0.25 inch thick and having densities of about 6.68 grams per cubic centimeter. The thermal conductivity of the explosively treated and untreated materials was determined by measuring the temperature differential across 0.25-inch thick samples of the above-described bars one side of each of which was placed in contact with a heating element. FIGURE 8 in which the temperature differential is plotted against the temperature of the junction between the heating element and the bar shows that the explosively treated material which had a line broadening $\beta(d\ 2.03\ \text{A.})$ of 0.23 degree $2\theta$ had a greater temperature differential and a correspondingly lower thermal conductivity than did the untreated bismuth telluride which had a line broadening $\beta(d\ 2.03\ \text{A.})$ of 0.06 degree $2\theta$. The average value of the thermal conductivity of explosively treated bismuth telluride was $0.014\pm.002$ watts/cm. ° K. while that of the untreated material was $0.019\pm.002$ watts/cm. ° K.

The mechanical properties of bismuth telluride were improved by explosive treatment. For example, the compressive strength of cold-pressed bars made from explosively treated powder was as much as 300 percent of that of bars made from untreated powder.

EXAMPLE 34

A 72.5-gram sample of gamma-ferric oxide having a line broadening $\beta(d\ 2.52\ \text{A.})$ of 0.21 degree $2\theta$ and an average particle size smaller than $44\mu$ was subjected to explosive treatment as shown in FIGURE 1 using the stainless steel tube described above. The bulk density of the powder as packed in the tube prior to detonation was 2.1 grams per cubic centimeter or about 42 percent of the crystalline density and detonation was carried out under water.

After explosive treatment, the agglomerate was milled to a powder having a line broadening $\beta(d\ 2.52\ \text{A.})$ of about 0.35 degree $2\theta$ and a very fine particle size.

EXAMPLES 35–37

Several samples of molybdenum and tungsten were subjected to explosive treatment as shown in FIGURE 1 using the aluminum tube described above and then were milled in acetone to produce fine powders. The line broadening of the powders before and after explosive treatment and the conditions under which explosive treatment was carried out are given in Table XXIII.

TABLE XXIII

| | Example | | |
|---|---|---|---|
| | 35 | 36 | 37 |
| | $\beta(d\ 2.24\ \text{A.})$ | $\beta(d\ 2.22\ \text{A.})$ | $\beta(d\ 2.24\ \text{A.})$ |
| Composition | W | Mo | W |
| Initial line broadening, degrees $2\theta$ | 0.02 | 0.02 | 0.04 |
| Packed Density, g./cc | 10.54 | 5.92 | 7.04 |
| Packed Density, Percent Crystalline Density | 54.7 | 58 | 36.5 |
| Weight Distribution of Explosives, g./sq. in. | 15 | 15 | 15 |
| Weight Ratio Explosives/Powder | 2.27 | 4.03 | 3.42 |
| Final line broadening, degrees $2\theta$ | 0.08 | 0.09 | 0.13 |

After milling, the explosively treated metal powders and comparable samples of the untreated powders which had been milled under the same conditions were cold-pressed into bars 2 inches long and 0.25 inch wide. The physical properties of the milled powders before and after cold-pressing and the conditions under which cold-pressing was carried out are listed in Table XXIV.

Explosively treated tungsten having a line broadening $\beta(d\ 2.24\ \text{A.})$ of 0.09 degree $2\theta$ and untreated tungsten having a line broadening $\beta(d\ 2.24\ \text{A.})$ of 0.02 degree $2\theta$, both of which powders had an average particle size smaller than $44\mu$ also were cold-pressed under 15,000 to 20,000 pounds per square inch hydraulic pressure into disks of ⅝-inch diameter. The density of the disks prepared from explosively-treated powder was as high as 11.73 grams per cubic centimeter or 60.8 percent of the crystalline density and the compressive strength of the disks was as high as 4000 pounds per square inch. Corresponding values for disks prepared from untreated powder were 8.75 grams per cubic centimeter or 45.3 percent and 700 pounds per square inch, respectively.

We claim:

1. Brittle inorganic crystalline powders having an average particle size less than about 500 microns and exhibiting a broadening, $\beta(d)$, of the X-ray diffraction lines of a peak corresponding to lattice spacing $d$ (in angstroms) measured at half intensity and expressed in degrees $2\theta$, $\theta$ being the diffraction angle at which X-ray reflection occurs, such that a plot of $\beta(d)\cos\theta$ versus $\sin\theta$ produces a straight line intercepting the ordinate above the origin and having a positive slope above 0.02.

2. The brittle crystalline metal powders of claim 1 which exhibit a broadening, $\beta(d)$ of the X-ray diffraction lines such that said slope is above 0.05.

3. Brittle inorganic, nonmetallic crystalline powders having an average particle size less than about 150 microns and exhibiting a broadening, $\beta(d)$, of the X-ray diffraction lines of a peak corresponding to lattice spacing $d$ (in angstroms) measured at half intensity and expressed in degrees $2\theta$, $\theta$ being the diffraction angle at which X-ray reflection occurs, such that a plot of $\beta(d)\cos\theta$ versus $\sin\theta$ produces a straight line intercepting the ordinate above the origin and having a positive slope of at least 0.05.

4. A brittle nonmetallic crystalline powder of claim 3 selected from the group consisting of refractory oxides and carbides.

5. $\alpha$-Alumina powder of claim 3 having an average particle size between about 0.5 and 150 microns and an X-ray diffraction line broadening $\beta(d\ 2.09\ \text{A.})$ of about from 0.05 to 0.50 degree $2\theta$.

6. Barium ferrite powder of claim 3 having an average particle size between about 0.5 and 150 microns and an X-ray diffraction line broadening $\beta(d\ 2.77\ \text{A.})$ of about from 0.05 to 0.49 degree $2\theta$.

7. Barium titanate powder of claim 3 having an average particle size between about 0.5 and 150 microns and an X-ray diffraction line broadening $\beta(d\ 2.32\ \text{A.})$ of about from 0.05 to 0.35 degree $2\theta$.

8. Silicon carbide powder of claim 3 having an average particle size between about 0.5 and 150 microns and an X-ray diffraction line broadening $\beta(d\ 2.52\ \text{A.})$ of about from 0.04 to 0.40 degree $2\theta$.

9. Boron carbide powder of claim 3 having an average particle size between about 0.5 and 150 microns and an X-ray diffraction line broadening $\beta(d\ 2.38\ \text{A.})$ of about from 0.25 to 0.35 degree $2\theta$.

10. Magnesium oxide powder of claim 3 having an

TABLE XXIV

| Condition | | X-ray Line Broadening, degrees $2\theta$ | Particle Size, $\mu$ | Forming Pressure, p.s.i. | Cold-Pressed Density | |
|---|---|---|---|---|---|---|
| | | | | | G./cc. | Percent Crystalline Density |
| Composition: | | | | | | |
| W | Explosively treated | $\beta(d\ 2.24\ \text{A.})=0.09$ | <150 | 20,000 | 9.67 | 50.1 |
| W | Untreated | $\beta(d\ 2.24\ \text{A.})=0.02$ | <150 | 20,000 | 8.55 | 44.3 |
| Mo | Explosively treated | $\beta(d\ 2.22\ \text{A.})=0.09$ | <150 | 20,000 | 5.20 | 50.8 |
| Mo | Untreated | $\beta(d\ 2.22\ \text{A.})=0.02$ | <150 | 20,000 | 4.82 | 47.2 |
| W | Explosively treated | $\beta(d\ 2.24\ \text{A.})=0.09$ | <150 | 40,000 | 10.23 | 53.1 |
| W | Untreated | $\beta(d\ 2.24\ \text{A.})=0.02$ | <150 | 40,000 | 9.59 | 49.7 | verage particle size between about 0.5 and 150 microns and an X-ray diffraction line broadening $\beta(d\ 2.10\ \text{A.})$ of about from 0.05 to 0.40 degree $2\theta$.

11. Titanium carbide powder of claim 3 having an average particle size between about 0.5 and 150 microns and an X-ray diffraction line broadening $\beta(d\ 2.17\ \text{A.})$ of about from 0.05 to 0.30 degree $2\theta$.

12. Bismuth telluride powder of claim 3 having an average particle size between about 0.5 and 150 microns and an X-ray diffraction line broadening $\beta(d\ 2.03\ \text{A.})$ of about from 0.07 to 0.40 degree $2\theta$.

13. A process for preparing brittle inorganic crystalline powders having a strained crystal lattice and an average particle size less than about 500 microns, which comprises:
  (1) passing a shock wave generated by detonation of an explosive having a detonation velocity of at least 1500 meters per second through a mass of brittle inorganic crystalline powder having a bulk density of at least 10% of its crystalline density and an average particle size no greater than about 4500 microns, the shock wave being of sufficient intensity and velocity to convert said mass to an agglomerate and said powder being stable to deleterious physical and chemical change up to at least 300° C., and
  (2) comminuting the resulting agglomerate to break the weak mechanical bonds among its constituent particles.

14. A process of claim 13 wherein the weight ratio of said explosive to said powder is between 0.01 and 10, said mass of powder is within a metal container, and said explosive is contiguous to said container.

15. A process for preparing brittle inorganic crystalline powders having a strained crystal lattice and an average particle size less than about 500 microns, which comprises
  (1) placing an explosive having a detonation velocity of at least 1500 meters per second adjacent to a mass of a brittle inorganic crystalline powder having a bulk density of at least 10 percent of the crystalline density of the powder, said powder having an average particle size no greater than about $4500\mu$ and being stable to deleterious physical and chemical changes up to at least 300° C., and the weight ratio of said explosive to said powder being between 0.01 and 10;
  (2) detonating said explosive so that a shock wave is propagated through said mass of brittle inorganic crystalline powder at a velocity of at least about 600 meters per second thereby imparting a particle velocity of at least about 300 meters per second to the particles of said mass of brittle inorganic crystalline powder; and
  (3) comminuting the resulting agglomerate of brittle inorganic crystalline powder.

16. A process as in claim 15 wherein said mass of powder is in a metal container and said explosive surrounds, and is contiguous to, said container.

17. A process as in claim 15 wherein said mass of inorganic, crystalline powder is in a metal container which surrounds and is contiguous to said explosive.

18. A process as in claim 15 wherein said mass of powder is in a metal container and said explosive is in contact with one side of said container.

19. A process as in claim 15 wherein said inorganic crystalline powder is a ceramic composition selected from the group consisting of oxides, carbides, nitrides, borides, tellurides, silicides, titanates, ferrites and mixtures thereof.

20. A process for preparing brittle inorganic crystalline powders having a strained crystal lattice and an average particle size less than about 150 microns, which comprises
  (1) placing an explosive having a detonation velocity between 3000 and 8000 meters per second contiguous to a metal container wherein there is a mass of brittle inorganic crystalline powder having a bulk density of at least 30 percent of the crystalline density of the powder, said powder having an average particle size between about 1 and $150\mu$ and being stable to deleterious physical and chemical changes up to at least 300° C., and the weight ratio of said explosive to said powder being from 0.5 to 5.0;
  (2) detonating said explosive so that a shock wave is propagated through said mass of brittle inorganic crystalline powder at a velocity of at least about 600 meters per second thereby imparting a particle velocity of at least about 300 meters per second to the particles of said mass of brittle inorganic crystalline powder; and
  (3) comminuting the resulting agglomerate of brittle inorganic crystalline powder.

References Cited

UNITED STATES PATENTS

| | | | |
|---|---|---|---|
| 492,767 | 2/1893 | Acheson | 23—208 |
| 1,940,409 | 12/1933 | Fink | 23—51 |
| 2,454,227 | 11/1948 | Smith et al. | 23—143 |
| 2,849,275 | 8/1958 | Bleecker | 23—315 |
| 2,952,980 | 9/1960 | Doulgas | 252—62.3 |
| 2,992,079 | 9/1961 | Linares et al. | 23—51 |
| 3,022,139 | 2/1962 | Clark et al. | 23—204 |

FOREIGN PATENTS

| | | |
|---|---|---|
| 235,642 | 6/1960 | Australia. |

OTHER REFERENCES

Pearson: Journal of Metals, September 1960, pp. 673–681.

MILTON WEISSMAN, *Primary Examiner.*

OSCAR R. VERTIZ, *Examiner.*

H. S. MILLER, *Assistant Examiner.*